(12) United States Patent
Xun et al.

(10) Patent No.: US 12,511,589 B2
(45) Date of Patent: Dec. 30, 2025

(54) METHOD, APPARATUS, AND SYSTEM FOR POSITIONING ELECTRONIC DEVICE, SERVER, AND STORAGE MEDIUM

(71) Applicant: Petal Cloud Technology Co., Ltd., Dongguan (CN)

(72) Inventors: Yong Xun, Dongguan (CN); Changzhou Chen, Nanjing (CN); Xiangyang Wang, Nanjing (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 644 days.

(21) Appl. No.: 17/914,667

(22) PCT Filed: Mar. 23, 2021

(86) PCT No.: PCT/CN2021/082264
§ 371 (c)(1),
(2) Date: Sep. 26, 2022

(87) PCT Pub. No.: WO2021/190470
PCT Pub. Date: Sep. 30, 2021

(65) Prior Publication Data
US 2023/0126152 A1    Apr. 27, 2023

(30) Foreign Application Priority Data

Mar. 24, 2020 (CN) .................. 202010214823.X

(51) Int. Cl.
*H04W 4/029* (2018.01)
*G06F 16/2457* (2019.01)
(Continued)

(52) U.S. Cl.
CPC ......... *G06Q 10/04* (2013.01); *G06F 16/2457* (2019.01); *G06F 16/2458* (2019.01); *H04W 4/029* (2018.02); *H04W 64/00* (2013.01)

(58) Field of Classification Search
CPC ..... H04W 4/029; H04W 64/00; H04W 76/25; H04L 67/535
(Continued)

(56) References Cited

U.S. PATENT DOCUMENTS 8,855,901 B2 * 10/2014 Leader ............... G01C 21/3617
701/428
2003/0220984 A1 * 11/2003 Jones .................. H04L 63/0428
709/219

(Continued)

FOREIGN PATENT DOCUMENTS

| CN | 104735783 A | 6/2015 |
|---|---|---|
| CN | 105099830 A | 11/2015 |

(Continued)

*Primary Examiner* — Joseph Arevalo
(74) *Attorney, Agent, or Firm* — Leydig, Voit & Mayer, Ltd.

(57) ABSTRACT

An artificial intelligence (AI)-based method, apparatus, and system are provided for positioning an electronic device, a server. The method includes: a server obtains a prediction request, determines historical data of an electronic device based on a device identifier, and generates query prediction information. The server further outputs the query prediction information. According to this application, when a positioning query request sent by a terminal device is received, the query prediction information corresponding to the positioning query request can be generated based on the historical data of the to-be-queried electronic device, and the query prediction information is output to the terminal device, so that a user can learn, based on the query prediction information, prediction information such as time consumed for query or a positioning success rate.

20 Claims, 16 Drawing Sheets

(51) Int. Cl.
*G06F 16/2458* (2019.01)
*G06Q 10/04* (2023.01)
*H04W 64/00* (2009.01)

(58) Field of Classification Search
USPC ...... 455/456.2, 456.3, 574, 456.1, 450, 454,
455/452.1, 418.422, 1.23, 414.1
See application file for complete search history.

(56) References Cited

U.S. PATENT DOCUMENTS

2013/0345961 A1* 12/2013 Leader ................... G01C 21/20
701/410
2016/0280401 A1* 9/2016 Driscoll .................. G01S 5/011
2018/0047091 A1* 2/2018 Ogden ............... G01C 21/3484
2018/0077619 A1 3/2018 Bitra et al.
2019/0319868 A1* 10/2019 Svennebring ......... H04W 24/08
2021/0390483 A1* 12/2021 Nenninger ....... G06Q 10/06315

FOREIGN PATENT DOCUMENTS

| CN | 204759061 U | 11/2015 |
|---|---|---|
| CN | 105307263 A | 2/2016 |
| CN | 105450840 A | 3/2016 |
| CN | 105933862 A | 9/2016 |
| CN | 106060773 A | 10/2016 |
| CN | 205721097 U | 11/2016 |
| CN | 106341793 A | 1/2017 |
| CN | 106413089 A | 2/2017 |
| CN | 106547008 A | 3/2017 |
| CN | 107333232 A | 11/2017 |
| CN | 108513251 A | 9/2018 |
| CN | 110169088 A | 8/2019 |

\* cited by examiner

METHOD, APPARATUS, AND SYSTEM FOR POSITIONING ELECTRONIC DEVICE, SERVER, AND STORAGE MEDIUM

This application is a national stage of International Application No. PCT/CN2021/082264, filed on Mar. 23, 2021, which claims priority to Chinese Patent Application No. 202010214823.X, filed on Mar. 24, 2020. Both of the aforementioned applications are hereby incorporated by reference in their entireties.

TECHNICAL FIELD

This application relates to the field of artificial intelligence technologies, and in particular, to an artificial intelligence (AI)-based method, apparatus, and system for positioning an electronic device, a server, and a storage medium.

BACKGROUND

As positioning technologies continuously develop, a positioning module may be embedded into various types of devices, for example, a smartphone or a smartwatch, so that a user obtains position information by using the positioning model. In some occasions, when the user needs to obtain a position of a monitored object, a terminal device of the user may send a positioning query request to an electronic device of the monitored object; and the electronic device of the monitored object obtains position information by using a positioning module, and feeds back the position information to the terminal device of the user, so that the user positions and queries the monitored object.

However, in the conventional technology for positioning the electronic device, when sending the positioning query request, the user cannot determine a communication environment of the electronic device of the monitored object. When the communication environment is relatively poor, the electronic device reports the position information for a relatively long time. Consequently, the user needs to stay in a query interface of the terminal device for a long time to wait for a query result, and the user cannot perform another operation in the waiting process, which reduces use efficiency of the terminal device and affects user experience.

SUMMARY

Embodiments of this application provide a method, apparatus, and system for positioning an electronic device, a terminal device, a server, and a storage medium, to resolve problems that when a terminal device of a user positions an associated electronic device, the user needs to wait for a positioning result for a long time, which reduces use efficiency of the terminal device and has poor user experience.

According to a first aspect, an embodiment of this application provides a method for positioning an electronic device, including:

A prediction server obtains a prediction request sent by a service server, where the prediction request is generated by the service server based on a positioning query request sent by a terminal device, and the positioning query request carries a device identifier of the to-be-queried electronic device.

The prediction server determines historical data of the electronic device based on the device identifier, and generates query prediction information.

The prediction server outputs the query prediction information, where the query prediction information is output before the service server feeds back a positioning query result to the terminal device.

In a possible implementation of the first aspect, that the prediction server determines the historical data of the electronic device based on the device identifier, and generates the query prediction information includes:

The prediction server determines a prediction position of the electronic device based on the historical data of the electronic device.

The prediction server determines, based on the prediction position, signal strength corresponding to the electronic device at the prediction position.

The prediction server generates the query prediction information of the electronic device based on the signal strength.

In a possible implementation of the first aspect, that the prediction server determines the historical data of the electronic device based on the device identifier, and generates the query prediction information includes:

The prediction server obtains position information recently fed back by the electronic device.

The prediction server determines a query prediction model based on the position information recently fed back.

The prediction server outputs the query prediction information by using the query prediction model.

In a possible implementation of the first aspect, that the server determines the historical data of the electronic device based on the device identifier, and generates the query prediction information includes:

The prediction server determines, based on the device identifier of the electronic device, a query prediction model corresponding to the electronic device.

The prediction server obtains the query prediction information by using the query prediction model, where the query prediction model is constructed based on the historical data of the electronic device.

In a possible implementation of the first aspect, the method further includes:

The prediction server adjusts the query prediction model based on position information fed back by the electronic device based on the positioning query request, where the query prediction model is used to output the query prediction information.

In a possible implementation of the first aspect, that the server determines, based on the device identifier of the electronic device, the query prediction model corresponding to the electronic device and obtains the query prediction information by using the query prediction model includes:

The prediction server outputs a query prediction parameter by using the query prediction model.

The prediction server separately imports, based on a parameter type of each query prediction parameter, each query prediction parameter into a display area, associated with the parameter type, in a preset prediction information template, to generate the query prediction information.

In a possible implementation of the first aspect, that the prediction server determines, based on the device identifier of the electronic device, the query prediction model corresponding to the electronic device includes:

The prediction server queries, based on the device identifier, a plurality of candidate query models corresponding to the electronic device.

The prediction server selects, based on a difference between a moment of sending each piece of historical data fed back by the electronic device and a moment of receiving the prediction request, historical data corresponding to the smallest difference and determines a current scenario type of the electronic device.

The prediction server selects from the candidate query models, a candidate query model that matches the scenario type as the query prediction model.

In a possible implementation of the first aspect, the query prediction information includes query waiting duration, a positioning success rate, and/or at least one prediction position of the electronic device and confidence corresponding to the prediction position.

In a possible implementation of the first aspect, after the prediction server determines the historical data of the electronic device based on the device identifier, and generates the query prediction information, the method further includes:

If a prediction result corresponding to the query prediction information is a positioning failure state, the prediction server selects, based on a difference between a moment of sending each piece of historical data fed back by the electronic device and a moment of receiving the prediction request, historical data corresponding to the smallest difference as target data.

The prediction server outputs a positioning failure reason based on a running state and signal strength that are carried in the target data and that correspond to the electronic device at a moment of feeding back position information.

The prediction server imports the positioning failure reason into the query prediction information.

In a possible implementation of the first aspect, after the server determines the historical data of the electronic device based on the device identifier, and generates the query prediction information, the method further includes:

If a prediction result corresponding to the query prediction information is a positioning failure state, the prediction server selects, based on a difference between a moment of sending each piece of historical data fed back by the electronic device and a moment of receiving the prediction request, historical data corresponding to the smallest difference as target data.

The prediction server outputs a prediction position based on a historical position and a motion state that are carried in the target data and that correspond to the electronic device at a moment of feeding back position information.

The prediction server imports the prediction position into the query prediction information.

In a possible implementation of the first aspect, the historical data includes a heartbeat data packet fed back by the electronic device in a preset heartbeat period.

In a possible implementation of the first aspect, the historical data includes historical positioning information fed back by the electronic device based on a historical query request.

According to a second aspect, an embodiment of this application provides an apparatus for positioning an electronic device, including:

a prediction request obtaining unit, configured to obtain a prediction request, where the prediction request is generated based on a positioning query request sent by a terminal device, and the positioning query request carries a device identifier of the to-be-queried electronic device;

a query prediction information generation unit, configured to determine historical data of the electronic device based on the device identifier, and generate query prediction information; and a query prediction information output unit, configured to output the query prediction information, where the query prediction information is output before the service server feeds back a positioning query result to the terminal device.

According to a third aspect, an embodiment of this application provides a system for positioning an electronic device. The system for positioning the electronic device includes a service server, a prediction server, and a terminal device.

The terminal device is configured to send, to the service server, a positioning query request used to obtain a position of the electronic device.

The service server is configured to send, to the prediction server, a prediction request generated based on the received positioning query request.

The prediction server is configured to: in response to the prediction request, generate query prediction information based on historical data of the electronic device, and send the query prediction information to the service server.

The service server is configured to send the query prediction information to the terminal device.

The service server is configured to send a positioning query result to the user terminal based on position information fed back by the electronic device.

In a possible implementation of the third aspect, when determining the historical data of the electronic device based on the device identifier, and generating the query prediction information, the prediction server is specifically configured to:

The prediction server is configured to determine a prediction position of the electronic device based on the historical data of the electronic device.

The prediction server is configured to determine, based on the prediction position, signal strength corresponding to the electronic device at the prediction position.

The prediction server is configured to generate the query prediction information of the electronic device based on the signal strength.

In a possible implementation of the third aspect, when determining the historical data of the electronic device based on the device identifier, and generating the query prediction information, the prediction server is specifically configured to:

The prediction server is configured to obtain position information recently fed back by the electronic device.

The prediction server is configured to determine a query prediction model based on the position information recently fed back.

The prediction server is configured to output the query prediction information by using the query prediction model.

In a possible implementation of the third aspect, when determining the historical data of the electronic device based on the device identifier, and generating the query prediction information, the prediction server is specifically configured to:

The prediction server is configured to determine, based on the device identifier of the electronic device, a query prediction model corresponding to the electronic device.

The prediction server is configured to obtain the query prediction information by using the query prediction model, where the query prediction model is constructed based on the historical data of the electronic device.

According to a fourth aspect, an embodiment of this application provides a method for positioning an electronic device, including:

The server receives a positioning query request sent by a terminal device for positioning the electronic device.

The server obtains query prediction information, where the query prediction information is generated based on historical data of the electronic device.

The server sends the query prediction information to the terminal device.

The server sends a positioning query result to the user terminal based on position information fed back by the electronic device.

In a possible implementation of the fourth aspect, that the server obtains the query prediction information includes:

The server determines a prediction position of the electronic device based on the historical data of the electronic device.

The server determines, based on the prediction position, signal strength corresponding to the electronic device at the prediction position.

The server generates the query prediction information of the electronic device based on the signal strength.

In a possible implementation of the fourth aspect, that the server obtains the query prediction information includes:

The server obtains position information recently fed back by the electronic device.

The server determines a query prediction model based on the position information recently fed back.

The server outputs the query prediction information by using the query prediction model.

In a possible implementation of the fourth aspect, that the server obtains the query prediction information includes:

The server determines, based on the device identifier of the electronic device, a query prediction model corresponding to the electronic device.

The server obtains the query prediction information by using the query prediction model, where the query prediction model is constructed based on the historical data of the electronic device.

In a possible implementation of the fourth aspect, the method further includes:

The server adjusts the query prediction model based on position information fed back by the electronic device based on the positioning query request, where the query prediction model is used to output the query prediction information.

In a possible implementation of the fourth aspect, that the server obtains the query prediction information by using the query prediction model includes:

The server outputs a query prediction parameter by using the query prediction model.

The server separately imports, based on a parameter type of each query prediction parameter, each query prediction parameter into a display area, associated with the parameter type, in a preset prediction information template, to generate the query prediction information.

In a possible implementation of the fourth aspect, that the server determines, based on the device identifier of the electronic device, the query prediction model corresponding to the electronic device includes:

The server queries, based on the device identifier, a plurality of candidate query models corresponding to the electronic device.

The server selects, based on a difference between a moment of sending position information of each piece of historical data fed back by the electronic device and a moment of receiving the prediction request, historical data corresponding to the smallest difference and determines a current scenario type of the electronic device.

The server selects from the candidate query models, a candidate query model that matches the scenario type as the query prediction model.

In a possible implementation of the fourth aspect, the query prediction information includes query waiting duration, a positioning success rate, and/or at least one prediction position of the electronic device and confidence corresponding to the prediction position.

In a possible implementation of the fourth aspect, after the server obtains the query prediction information, the method further includes:

If a prediction result corresponding to the query prediction information is a positioning failure state, the server selects, based on a difference between a moment of sending each piece of historical data fed back by the electronic device and a moment of receiving the prediction request, historical data corresponding to the smallest difference as target data.

The server outputs a positioning failure reason based on a running state and signal strength that are carried in the target data and that correspond to the electronic device at a moment of feeding back position information.

The server imports the positioning failure reason into the query prediction information.

In a possible implementation of the fourth aspect, after the server obtains the query prediction information, the method further includes:

If a prediction result corresponding to the query prediction information is a positioning failure state, the server selects, based on a difference between a moment of sending each piece of historical data fed back by the electronic device and a moment of receiving the prediction request, historical data corresponding to the smallest difference as target data.

The server outputs a prediction position based on a historical position and a motion state that are carried in the target data and that correspond to the electronic device at a moment of feeding back position information.

The server imports the prediction position into the query prediction information.

In a possible implementation of the fourth aspect, the historical data includes a heartbeat data packet fed back by the electronic device in a preset heartbeat period.

In a possible implementation of the fourth aspect, the historical data includes historical positioning information fed back by the electronic device based on a historical query request.

According to a fifth aspect, an embodiment of this application provides an apparatus for positioning an electronic device, including:

a positioning query request receiving unit, configured to receive a positioning query request sent by a terminal device for positioning the electronic device;

a query prediction information generation unit, configured to obtain query prediction information, where the query prediction information is generated based on historical data of the electronic device;

a query prediction information output unit, configured to send the query prediction information to the terminal device; and a positioning query result output unit, configured to send a positioning query result to the user terminal based on position information fed back by the electronic device.

According to a sixth aspect, an embodiment of this application provides a system for positioning an electronic device. The system for positioning the electronic device includes a server, and a terminal device.

The terminal device is configured to send, to the server, a positioning query request used to obtain a position of the electronic device.

The server is configured to obtain query prediction information, where the query prediction information is generated based on historical data of the electronic device.

The server is configured to send the query prediction information to the terminal device.

The server is configured to send a positioning query result to the user terminal based on position information fed back by the electronic device.

In a possible implementation of the sixth aspect, when obtaining the query prediction information, the server is specifically configured to:

The server is configured to determine a prediction position of the electronic device based on the historical data of the electronic device.

The server is configured to determine, based on the prediction position, signal strength corresponding to the electronic device at the prediction position.

The prediction server is configured to generate the query prediction information of the electronic device based on the signal strength.

In a possible implementation of the sixth aspect, when obtaining the query prediction information, the server is specifically configured to:

The server is configured to obtain position information recently fed back by the electronic device.

The server is configured to determine a query prediction model based on the position information recently fed back.

The server is configured to output the query prediction information by using the query prediction model.

In a possible implementation of the sixth aspect, when obtaining the query prediction information, the server is specifically configured to:

The server is configured to determine, based on the device identifier of the electronic device, a query prediction model corresponding to the electronic device.

The server is configured to obtain the query prediction information by using the query prediction model, where the query prediction model is constructed based on the historical data of the electronic device.

According to a seventh aspect, an embodiment of this application provides a server including a memory, a processor, and a computer program that is stored in the memory and that can run on the processor. When the server executes the computer program, the method for positioning the electronic device according to any one of the first aspect or the fourth aspect is implemented.

According to an eighth aspect, an embodiment of this application provides a computer-readable storage medium. The computer-readable storage medium stores a computer program. When the computer program is executed by a processor, the method for positioning the electronic device according to any one of the first aspect or the fourth aspect is implemented.

According to a ninth aspect, an embodiment of this application provides a computer program product. When the computer program product runs on a terminal device, the terminal device is enabled to perform the method for positioning the electronic device according to any one of the first aspect or the fourth aspect.

Compared with the conventional technology, embodiments of this application have the following beneficial effects.

In embodiments of this application, when the positioning query request sent by the terminal device is received, the query prediction information corresponding to the positioning query request can be generated based on the historical data of the to-be-queried electronic device, and the query prediction information is output to the terminal device, so that the user can learn, based on the query prediction information, the prediction information such as the positioning success rate, so as to determine whether to continue to wait for the query result or perform another operation on the terminal device, without the user keeping a query interface displayed at a frontend for a long time. This improves use efficiency of the terminal device and improves user experience.

DESCRIPTION OF EMBODIMENTS

Figure 1:
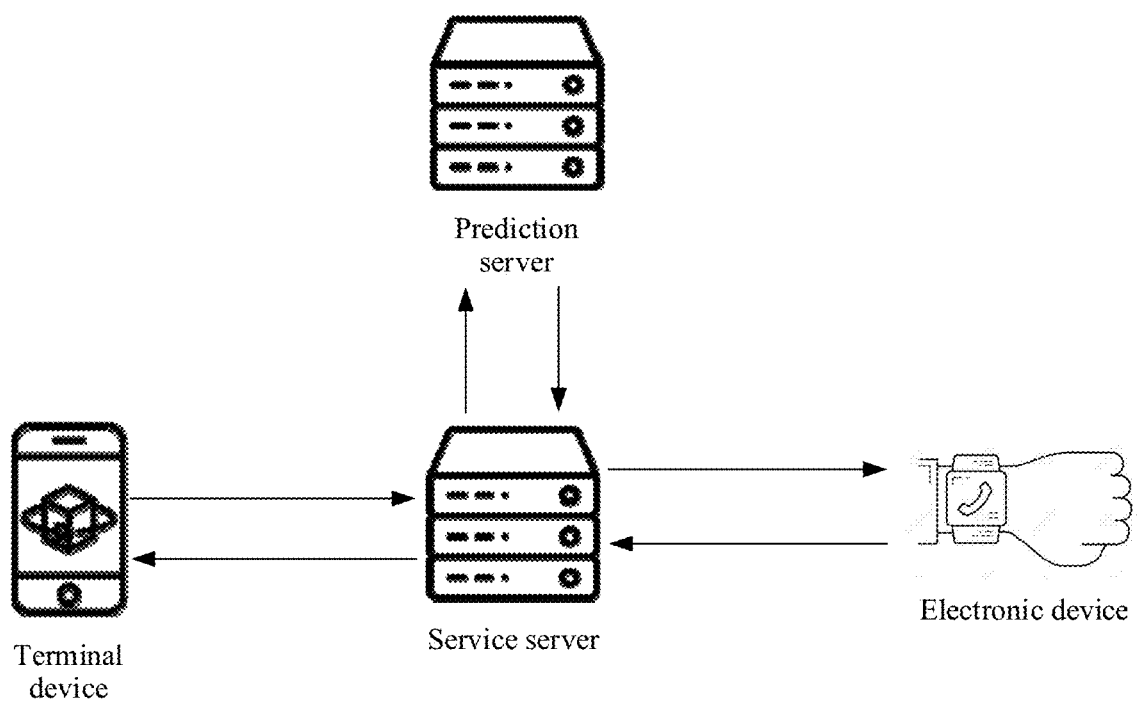
FIG. 1 is a schematic diagram of a structure of a system for positioning an electronic device according to an embodiment of this application.

In the following description, to illustrate rather than limit, specific details such as a particular system structure, and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the claims of this application, the term "if" may be interpreted as "when", "once", "in response to determining", or "in response to detecting" depending on the context. Likewise, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the description of the specification and the claims of this application, the terms "first", "second", and the like are merely used for differentiation and description, but shall not be understood as an indication or an implication of relative importance.

Reference to "an embodiment" or the like described in this specification of this application indicates that one or more embodiments of this application include a specific feature, structure, or characteristic described with reference to embodiments. Therefore, statements such as "in an embodiment" that appear at different places in this specification do not necessarily mean referring to a same embodiment, instead, they mean "one or more but not all of embodiments", unless otherwise specifically emphasized. The terms "include", "comprise", "have", and their variants all mean "include but are not limited to", unless otherwise specifically emphasized.

Embodiment 1

In the conventional technology, when a terminal device of a user positions an associated electronic device, the user usually needs to stay in a query interface for a long time to wait for a positioning result, which reduces use efficiency of the terminal device and has poor user experience. To resolve the disadvantages, this embodiment of this application provides a system for positioning an electronic device.

FIG. 1 is a schematic diagram of a structure of the system for positioning the electronic device according to this embodiment of this application. Refer to FIG. 1. The system for positioning the electronic device includes a service server, a prediction server, a terminal device, and the electronic device. The electronic device includes but is not limited to an electronic device, such as a smartwatch, a smart band, or a smart headset, that may be configured with a positioning module. A communication link may be established between the service server and the prediction server, and data exchange is performed through the communication link. A communication link may be established between the service server, the terminal device, and the electronic device, and data exchange is performed through the communication link. A client program matching the system for positioning the electronic device may be installed on the terminal device. A user may initiate a positioning query request about the electronic device in an operation interface corresponding to the client program. The terminal device may include man-machine interaction controls such as a touchscreen, a numeric keypad, and a mouse, so that the user enters related instructions, for example, the positioning query request, and a display module such as the touchscreen or a display outputs a positioning query result. The terminal device may further include a communications module, and establish a communication connection to the service server by using the communications module, so as to send the positioning query request to the service server and receive query prediction information and the positioning query result that are fed back by the service server. The service server and the prediction server may be encapsulated in a same physical server, or may be two independent physical servers, and are configured to process a positioning service procedure and a query prediction procedure respectively. A data storage module may be configured for each of the service server and the prediction server. The service server may store, by using the data storage module, a positioning query request sent by each terminal device, and position information fed back by the electronic device. The data storage module of the prediction server may be configured to store historical data fed back by each electronic device, and optionally, may further store a query prediction model corresponding to each electronic device. The electronic device includes a positioning module, and the positioning module may be a global positioning system GPS module. The positioning module obtains the position information, and sends the position information to the service server in a preset heartbeat feedback period, or feeds back the position information when receiving a positioning query instruction sent by the service server. The electronic device may further include a communications module, and establishes a long connection with the service server by using the communications module, and send positioning information to the service server.

In a possible implementation, the electronic device may be a device having a same function as the terminal device. In another application scenario, the electronic device may also initiate a positioning query instruction to the server, to determine a position of the terminal device.

In a possible implementation, the electronic device is specifically a wearable device, to ensure that position information obtained through collection is position information of a to-be-monitored object.

Figure 2:
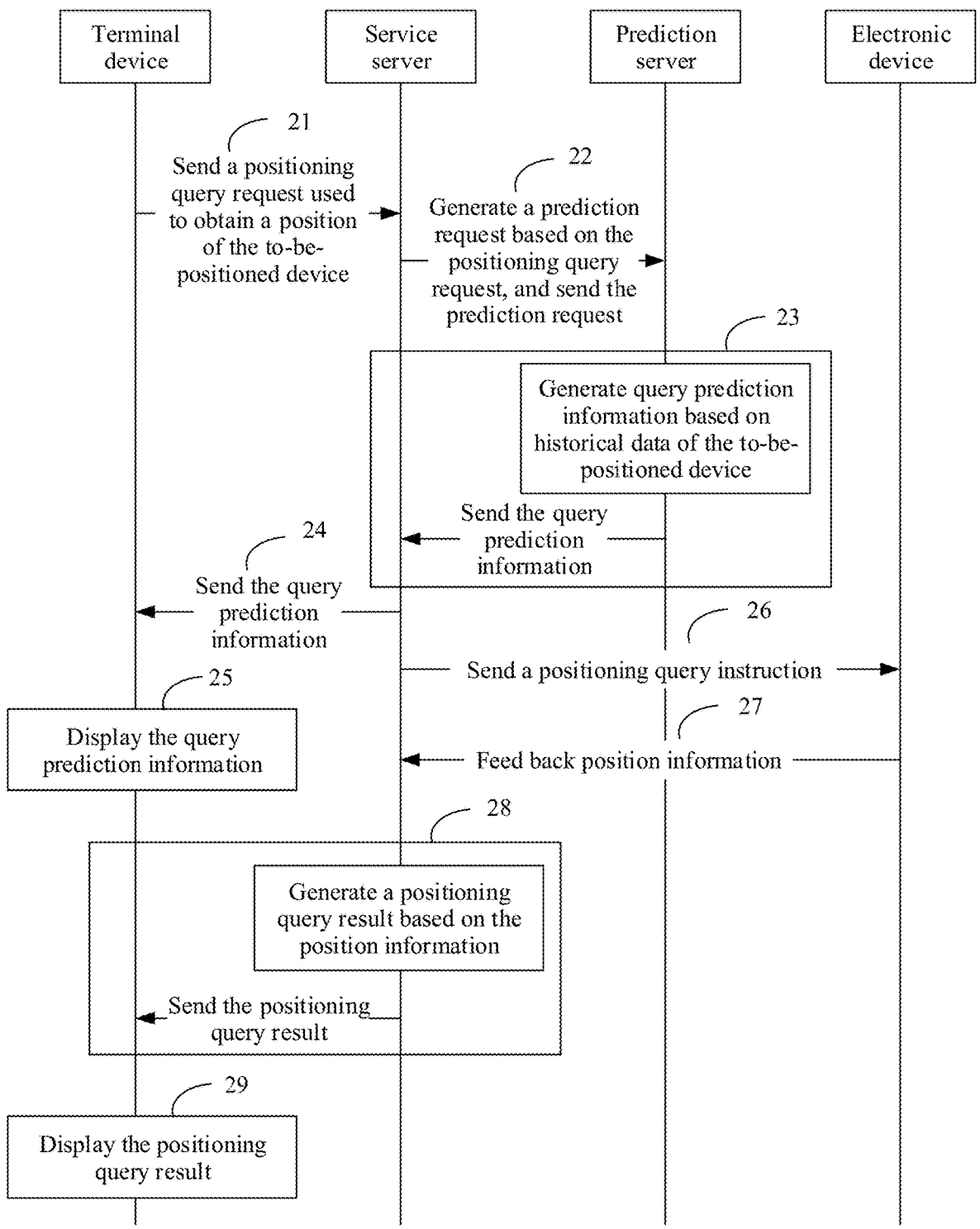
FIG. 2 is an interaction flowchart of a system for positioning an electronic device according to an embodiment of this application.

FIG. 2 is an interaction flowchart of the system for positioning the electronic device according to this embodiment of this application. Details are as follows:

In S21, the terminal device sends, to the service server, the positioning query request used to obtain a position of the electronic device.

In this embodiment, the user may generate the positioning query request on the terminal device. By way of example, and not limitation, the user may generate the positioning query request by installing the client matching the server and tapping an associated control in the query interface generated by the client in an interaction interface of the terminal device. When the positioning query request is generated, the user may enter a device identifier of the electronic device, to indicate to query the corresponding electronic device. Optionally, the terminal device may establish an association relationship between a terminal device and an electronic device based on setting of the user. The user may select an electronic device from the association relationship as the electronic device to be queried by default. When the positioning query request is generated, a device identifier of the electronic device to be queried by default is automatically added to the positioning query request. This can reduce a selection operation of the user. The correspondence is established, so that each time the terminal device initiates the positioning query request, the to-be-queried electronic device does not need to be manually entered again. This can improve query efficiency of the positioning query request.

In this embodiment, after generating the positioning query request, the terminal device may send the positioning query request to the service server, so that the service server obtains the position information of the electronic device.

In S22, the service server receives the positioning query request, generates a prediction request based on the positioning query request, and sends the prediction request to the prediction server.

In this embodiment, before feeding back the positioning query result, the service server first needs to send the query prediction information to the terminal device. Therefore, after receiving the positioning query request sent by the terminal, the service server first generates the prediction request based on the positioning query request, and sends the prediction request to the prediction server, so as to obtain the query prediction information generated by the prediction server.

In this embodiment, the service server may receive a positioning query request sent by each terminal device. The positioning query request may carry a device identifier of an electronic device, to obtain position information of the electronic device associated with the device identifier. Optionally, if the terminal device establishes the association relationship between the terminal device and the electronic device, the terminal device may upload the established association relationship to the service server, where each terminal device in the association relationship is bound to at least one electronic device to be queried by default. In this case, the positioning query request uploaded by the terminal device may not carry the device identifier of the electronic device. Because the service server may maintain the association relationship, after receiving the positioning query request sent by the terminal device, the service server may query, based on a device identifier of a request initiator (the terminal device), the association relationship associated with the device identifier of the terminal device, so as to determine the electronic device bound to the request initiator (the terminal device), determine the electronic device whose positioning information needs to be queried, and include, in the prediction request sent to the prediction server, the identifier of the determined electronic device whose positioning information needs to be queried. The service server maintains the association relationship corresponding to the terminal device, and when receiving the positioning service request, determines the electronic device associated with the terminal device through querying the association relationship, without the user manually entering the device identifier of the to-be-queried electronic device. This reduces a user operation.

Figure 3:
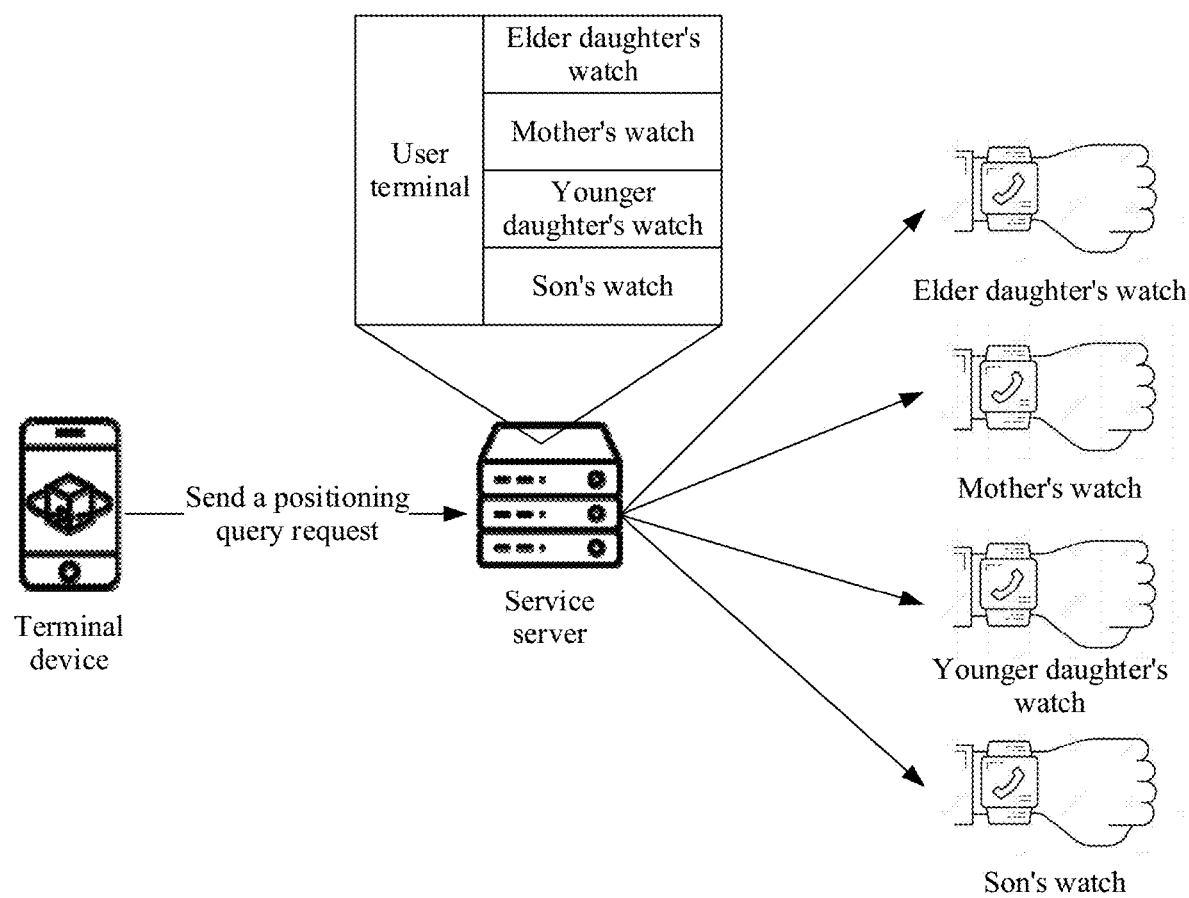
FIG. 3 is a schematic diagram of a process of positioning an electronic device according to an embodiment of this application.

By way of example, and not limitation, FIG. 3 is a schematic diagram of a process of positioning the electronic device according to this embodiment of this application. Refer to FIG. 3. The terminal device may pre-enter a correspondence in the service server by using the client. The terminal device is bound to four different electronic devices: eldest daughter's watch, mother's watch, young daughter's watch, and son's watch. When the service server receives the positioning query request initiated by the terminal device, the service server may query, based on a terminal identifier of the terminal device, the correspondence associated with the terminal device, determine electronic devices bound to the terminal device, and generate corresponding prediction requests for the electronic devices that have a binding relationship with the terminal device, so that the prediction server generates query prediction information of each electronic device.

Optionally, if there are a plurality of electronic devices bound to the terminal device, in addition to simultaneously generating prediction requests of the plurality of electronic devices, the user may further select, by using an interaction module of the terminal device, one of the plurality of electronic devices as the target electronic device corresponding to the current query operation. The service server may generate, based on the selection operation of the user, the prediction request of the target electronic device, and send the prediction request to the service server.

Figure 4:
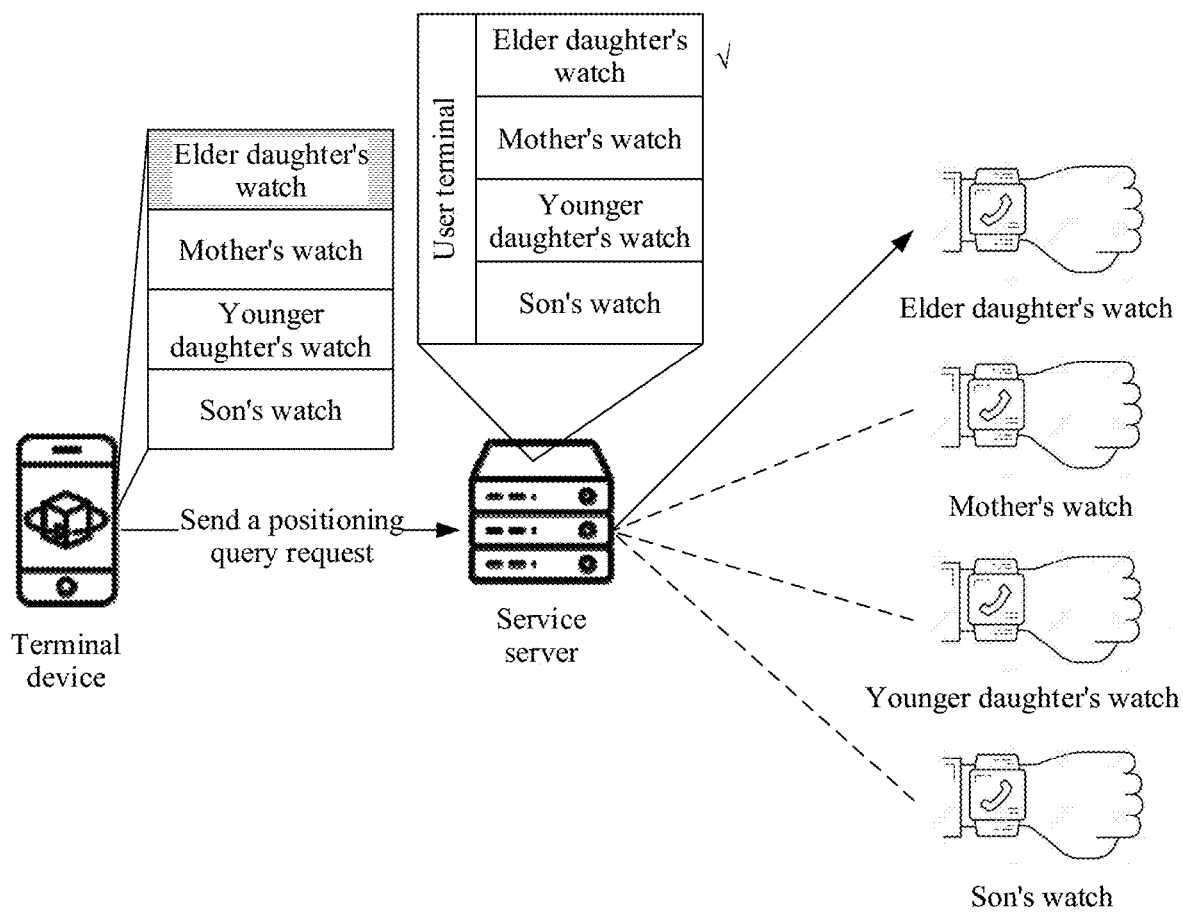
FIG. 4 is a schematic diagram of another process of positioning an electronic device according to an embodiment of this application.

By way of example, and not limitation, FIG. 4 is a schematic diagram of another process of positioning the electronic device according to this embodiment of this application. Refer to FIG. 4. The terminal device may display a device list in an interaction interface. The device list includes device names of a plurality of electronic devices associated with the terminal device, and the device names are "eldest daughter's watch", "mother's watch", and "young daughter's watch", and "son's watch" in this embodiment. A user may select one from the device list as the target electronic device, and select the "eldest daughter's watch" as the target electronic device in this embodiment. The terminal device generates the corresponding positioning query request based on the selection operation of the user. The service server parses the positioning query request, determines that an electronic device indicated by the positioning query request is the eldest daughter's watch, and sends the prediction request including a device identifier of the eldest daughter's watch to the prediction server.

In a possible implementation, the client program related to the service server is installed on the terminal device. The terminal device may locally start the client program, establish a communication connection to the service server by using the client program, and send the positioning query request to the service server by using a UI button in the client program. Optionally, because position information belongs to privacy information of a user, after receiving the positioning query request sent by the terminal device, the service server determines whether the terminal device has permission to view the position information of the electronic device. For example, the terminal device and the electronic device may establish a query protocol in advance, that is, the electronic device has authorized the terminal device to view the position information of the terminal device. In this case, the service server identifies that the terminal device has the permission to view the electronic device. Based on this, if detecting that the terminal device has the query permission, the service server performs a subsequent positioning query operation; or if detecting that the terminal device does not have the permission to view the position information of the electronic device, the service server feeds back query failure information to the terminal device, so as to notify the terminal device to obtain the query authorization of the electronic device.

Optionally, the service server may configure an authorization validity period of the query permission. After receiving the positioning query request sent by the terminal device, the service server may determine whether a current moment is within the authorization validity period of the query permission of the terminal device. If the current moment is within the authorization validity period, the service server makes a response to the positioning query request; or if the current moment is beyond the authorization validity period of the query permission of the terminal device, the service server identifies that the positioning query request is an invalid request and returns the query failure information.

In S23, the prediction server generates, in response to the prediction request, the query prediction information based on historical data of the electronic device, and sends the query prediction information to the service server.

In this embodiment, the service server may receive position information and/or a heartbeat data packet fed back by each electronic device, and then the service server delivers the position information and/or the heartbeat data packet to the prediction server for storage. The prediction server may use the received data fed back by the electronic device as the historical data of the electronic device. Optionally, the prediction server may configure a corresponding database for each electronic device. Each database is used to store historical data associated with the electronic device. The prediction server establishes an association relationship between each database and a device identifier of the electronic device, and generates a corresponding index table based on the association relationship. After receiving the prediction request generated based on the positioning query request initiated by the terminal device, the prediction server may determine, by using the index table, a database associated with the electronic device in service databases, and obtain the historical data stored in the database.

In a possible implementation, because the electronic device sends a relatively large volume of historical data, to reduce storage pressure of the database, the prediction server may combine the historical data of the electronic data, for example, encapsulate a plurality of pieces of historical data having a same attribute or similar attribute into a same data packet. This can reduce a quantity of data blocks in the database, and improve storage efficiency of the database of the prediction server. By way of example, and not limitation, the prediction server may encapsulate a plurality of pieces of historical data whose position distances are less than a preset distance threshold and whose feedback time is less than a preset time threshold into a same data packet. By way of example, and not limitation, an electronic device A feeds back historical data at a place A at 11:00 a.m. on December 6, and also feeds back historical data at the place A at 11:01 a.m. on December 7. In this case, the prediction server determines that a difference between feedback time of the two pieces of historical data is 1 minute and a position distance is 0. In this case, the prediction server may combine the two pieces of historical data into one historical data packet. Certainly, if there are a plurality of pieces of same or similar historical data, the prediction server may also combine the plurality of pieces of historical data into a same data packet. For example, Table 1 is a schematic diagram of a format of the historical data packet obtained after combination. The historical data packet records a device name, a position, a feedback moment, and a quantity of feedback times. If there is no historical data packet same or similar to a piece of historical data, a value of a parameter item of the quantity of feedback times is 1. A value of a quantity of times in historical data packet is identified, and whether it is repetitive behavior or occasional behavior that the electronic device arrives at a position at a moment can be determined. This can conveniently identify a behavior habit of the user to which the electronic device belongs.

TABLE 1

| Device name | Position | Moment | Times |
|---|---|---|---|
| Electronic device A | Place A | 11:00 a.m. on December 6 and 7 | 2 |

In this embodiment, the query prediction information is specifically used to notify the user of related information of the current positioning query request, so that the user has a particular operation expectation on the current positioning query operation based on the query prediction information before receiving the positioning query result. This improves user experience in the positioning query process.

Further, in another embodiment of this application, the query prediction information includes query waiting duration and/or a positioning success rate.

The query waiting duration is specifically duration for making response to the positioning query request. The user may determine, based on the query waiting duration in the query prediction information, whether to stay in the current interface to wait for the positioning query result or may switch to another operation interface, and then return to the current interface after a period of time to view the position query result returned by the service server. By way of example, and not limitation, after the terminal device sends the positioning query request to the service server, the service server may generate the prediction request corresponding to the positioning query request, and send the prediction request to the prediction server for making a response. The prediction server determines, based on the historical data of the electronic device, that time required for the current positioning query operation is 30 seconds, and forwards the query prediction information including the query waiting duration to the service server. The service server returns the query prediction information to the terminal device. The terminal device may continue to stay in the current query interface, or may switch to another page to perform another operation and return to the query interface after 30 seconds or a longer time. In this case, the service server may have received the position information returned by the electronic device, generates the positioning query result, and returns the positioning query result to the terminal device. When switching back to the query interface, the terminal device can immediately query the position information of the electronic device. This prevents the user from waiting in the current interface for a long time due to inestimable time consumed for the positioning query request.

The positioning success rate is specifically a probability of receiving, within valid response time, the positioning information returned by the electronic device. The service server may set the valid response time. That is, after sending the positioning query instruction to the electronic device, the service server starts a calculator to detect time consumed for making response to the query operation. If detecting that a count value of the timer is greater than the valid response time, the service server determines that the current query operation fails. Alternatively, if receiving the position information fed back by the electronic device before a count value of the timer is less than or equal to the valid response duration, the service server may generate the positioning query result based on the position information, and return the positioning query result to the terminal device; and therefore the response succeeds. Therefore, the service server may send valid response duration to the prediction server, and the prediction server may output the positioning success rate based on the valid response duration. The prediction server may determine time consumed for query corresponding to the current response operation based on the historical data of the electronic device, compare the time consumed for query with the valid response duration preset by the service server, and determine the positioning success rate based on a comparison result. In a possible implementation, a manner of determining the positioning success rate may be as follows: If the time consumed for prediction obtained by the prediction server based on the historical data is far less than the valid response duration preset by the service server (for example, if a difference between the valid response duration and the time consumed for prediction is greater than a preset time difference threshold, it is identified that the time consumed for prediction is far less than the valid response duration), the success rate is relatively high, for example, 100%. If the time consumed for prediction is relatively close to the valid response duration (for example, the difference between the valid response duration and the time consumed for prediction is less than the time difference threshold), the success rate is relatively low, for example, 50% (a specific value may be determined based on an actual difference between the valid response duration and the time consumed for prediction, and may be obtained through calculation by using a preset conversion algorithm). If the time consumed for prediction is greater than the valid response duration, identification fails, for example, 0%. The positioning success rate is added to the query prediction information, so that the user can determine, based on the positioning success rate, whether to continue to wait for the positioning query result, or initiate a positioning query request again later. This can also prevents the user waiting in the query interface for a long time due to the undetermined time consumed for the positioning query, which affects the user to perform another operation.

Optionally, the query prediction information may further include at least one prediction position of the electronic device and prediction confidence corresponding to the prediction position. Before receiving the position information returned by the electronic device, the service server may return, to the terminal device, the query prediction information including the prediction position fed back by the prediction server, mark each prediction position in the query interface of the terminal device, and indicate a corresponding prediction confidence at the prediction position. In the query process, the user may view the prediction position of the electronic device, and determine a possible current position of the electronic device, so that a specific volume of information can be provided in the process in which the user waits for the electronic device to return the positioning information, thereby preventing the user from waiting for a long time; and a behavior habit of the electronic device can be learned based on the prediction position and the corresponding prediction confidence. This is particularly applied to a monitoring scenario. The prediction server can predict the current position of the electronic device based on the historical data, so that the user can determine a behavior habit of an object to which the electronic device belongs, thereby providing behavior habit information for monitoring decision-making.

By way of example, and not limitation, a user to which the terminal device belongs is a parent, and a user to which the electronic device belongs is a daughter. The prediction server may infer, based on the historical data of the electronic device, that the daughter may be currently at the prediction position, and the parent may learn, based on the prediction position and the prediction confidence corresponding to the prediction position, a place in which the daughter frequently visited at the time point, thereby having a better understanding the behavior habit of the daughter.

In this embodiment, the prediction server may obtain the historical data of the to-be-positioned electronic device through query, and generate the query prediction information based on the historical data of the electronic device. The query prediction information may include the query waiting duration, the positioning success rate, and/or the at least one prediction position of the electronic device and the confidence corresponding to the prediction position.

Specifically, S23 may include the following three implementations, which are respectively as follows:
1. Implementation 1 specifically includes the following steps: 1. The prediction server predicts the position of the electronic device by obtaining the historical data of the electronic device. 2. The prediction server determines, based on the prediction position, signal strength corresponding to the electronic device at the prediction position. 3. The prediction server generates the query prediction information of the electronic device based on the signal strength. If a prediction result corresponding to the query prediction information output in Implementation 1 is a positioning failure state, Implementation 1 may further include the following steps: 4. The prediction server selects historical data, of the electronic device, corresponding to the smallest difference between a moment of feeding back the position information and a current moment as target data. 5. The prediction server outputs a positioning failure reason based on a running state and signal strength that are carried in the target data and that correspond to the electronic device at the moment of feeding back the position information. 6. The prediction server outputs the prediction position based on a historical position and a motion state that are carried in the target data and that correspond to the electronic device at the feedback moment. 7. The prediction server imports the positioning failure reason and/or the prediction position into the query prediction information.
2. Implementation 2 specifically includes the following steps: 1. The prediction server obtains position information recently fed back by the electronic device. 2. The prediction server selects an associated query prediction model based on the position information that is recently fed back. 3. The prediction server outputs the query prediction information by using the query prediction model.

If a prediction result corresponding to the query prediction information output in Implementation 2 is a positioning failure state, Implementation 2 may further include the following steps: 4. The prediction server selects historical data, of the electronic device, corresponding to the smallest difference between a moment of feeding back the position information and a current moment as target data. 5. The prediction server outputs a positioning failure reason based on a running state and signal strength that are carried in the target data and that correspond to the electronic device at the moment of feeding back the position information. 6. The prediction server outputs the prediction position based on a historical position and a motion state that are carried in the target data and that correspond to the electronic device at the feedback moment. 7. The prediction server imports the positioning failure reason and/or the prediction position into the query prediction information.

3. Implementation 3 specifically includes the following steps: 1. The prediction server determines, based on the device identifier of the electronic device, a query prediction model corresponding to the electronic device. 2. The prediction server obtains the query prediction information by using the query prediction model, where the query prediction model is obtained through construction based on the historical data of the electronic device.

If a prediction result corresponding to the query prediction information output in Implementation 3 is a positioning failure state, Implementation 3 may further include the following steps: 3. The prediction server selects historical data, of the electronic device, corresponding to the smallest difference between a moment of feeding back position information and a current moment as target data. 4. The prediction server outputs a positioning failure reason based on a running state and signal strength that are carried in the target data and that correspond to the electronic device at the feedback moment. 5. The prediction server outputs the prediction position based on a historical position and a motion state that are carried in the target data and that correspond to the electronic device at the moment of feeding back the position information. 6. The prediction server imports the positioning failure reason and/or the prediction position into the query prediction information.

For a specific implementation procedure of Implementation 3, refer to descriptions of the following embodiments in FIG. 5a to FIG. 8.

Figure 9:
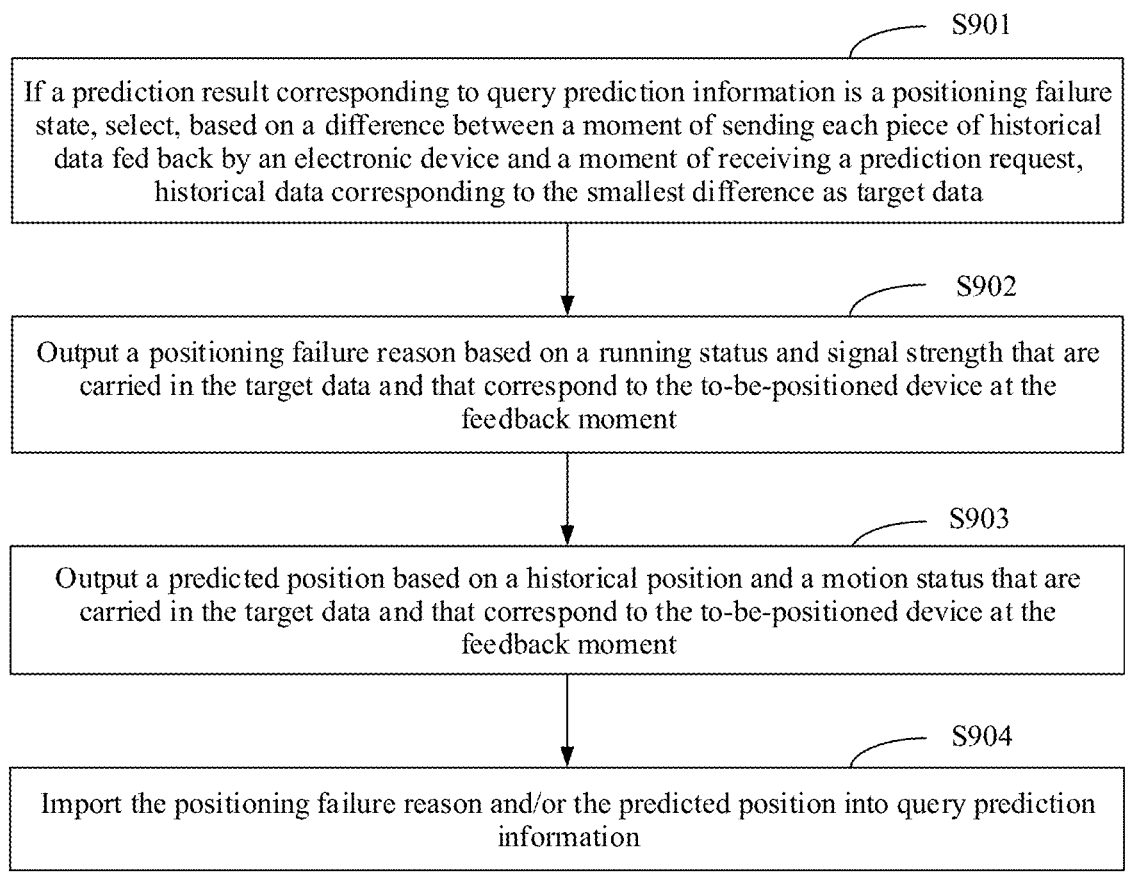
FIG. 9 is a flowchart of a specific implementation of S23 according to an embodiment of this application.

However, for Implementation 1, Implementation 2, and Implementation 3, when the output prediction result corresponding to the query prediction information is the positioning failure state, for a specific implementation process of a subsequent response procedure, refer to the following description in the embodiment in FIG. 9.

Figure 5A:
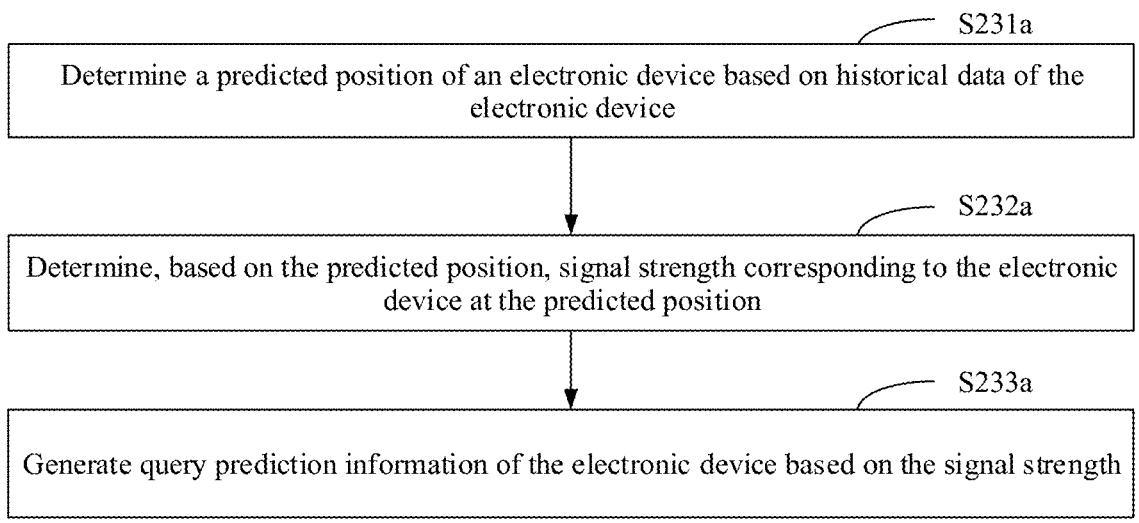
FIG. 5a is a flowchart of a specific implementation of S23 according to Embodiment 1 of this application.

FIG. 5a is a flowchart of a specific implementation of each step in Implementation 1 of S23. Refer to FIG. 5a. In this embodiment, S23 may include S231a to S233a. Details are as follows:

S231a: The prediction server predicts the position of the electronic device by obtaining the historical data of the electronic device.

Specifically, the prediction server may extract all the historical data of the electronic device from the database based on the device identifier of the electronic device, and determine the prediction position of the electronic device based on each piece of historical data. The prediction position is specifically a position, of the electronic device, obtained through calculation based on the historical data at the moment when the terminal device sends the positioning query request.

In a possible implementation, a manner in which the prediction server determines the prediction position may be as follows: The prediction server extracts a plurality of pieces of first target historical data on different dates from all the historical data of the electronic device. A feedback moment of the first target historical data is the same as or close to the moment when the terminal device sends the positioning query request, and the feedback moment is specifically a corresponding moment at which the electronic device reports the position information to the service server. The prediction server determines the prediction position of the electronic device based on historical position in the target historical data.

S232a: Determine, based on the prediction position, signal strength corresponding to the electronic device at the prediction position.

In this embodiment, the signal strength may be determined in the following two implementations, and the following two implementations are parallel implementations. In an actual application process, one of the following implementations may be selected to determine the signal strength.

Implementation A: The prediction server may store a signal strength distribution diagram, and the signal strength distribution diagram records signal strength associated with each position. The prediction server may mark a coordinate point of the determined prediction position on the signal strength distribution diagram, query signal strength associated with the coordinate point, and use the signal strength at the coordinate point as the signal strength corresponding to the prediction position.

Implementation B: The prediction server may extract all second target historical data about the prediction position from the historical data, a historical position in the second target historical data is the same as or close to the prediction position, and the historical position is specifically a position corresponding to a moment in which the electronic device reports the position information to the service server. The prediction server determines, based on historical signal strength in each piece of second target historical data, the signal strength corresponding to the prediction position.

S233a: Generate the query prediction information of the electronic device based on the signal strength.

In this embodiment, because the signal strength is stronger, a success rate that the electronic device can receive the positioning query instruction sent by the service server is higher, and time required for sending the positioning query instruction is shorter (because the signal strength is stronger, a transmission rate and a signal-to-noise ratio are higher, and therefore required transmission duration is shorter). Similarly, duration required by the electronic device to feed back the position information to the service server is shorter and the success rate is higher. Therefore, the signal strength of the electronic device is closely related to whether the query result succeeds and the query response duration. The prediction server may generate a conversion relationship between signal strength and query prediction information based on big data analysis, and import the obtained signal strength into the conversion relationship, to generate the query prediction information corresponding to the signal strength.

In this embodiment, the query prediction information may include at least one parameter related to the positioning query request. The parameter related to the positioning query request includes but is not limited to one or a combination of the following: the query response duration (namely, waiting time required by the terminal device), the positioning success rate, prediction accuracy, and the like. If the query prediction result is the positioning failure state, the positioning failure reason may be included.

A specific implementation procedure of Implementation 1 is described by determining the query waiting duration and the positioning success rate in the query prediction information. The prediction server may obtain all the historical data fed back by the electronic device, determine, based on the historical data, the prediction position at the moment when the electronic device receives the prediction request, obtain the signal strength corresponding to the prediction position, calculate the query waiting duration and/or the positioning success rate by using a conversion algorithm between the signal strength and a response parameter, and import the query waiting duration and/or the positioning success rate into a preset query prediction template to generate the query prediction information.

Figure 5B:
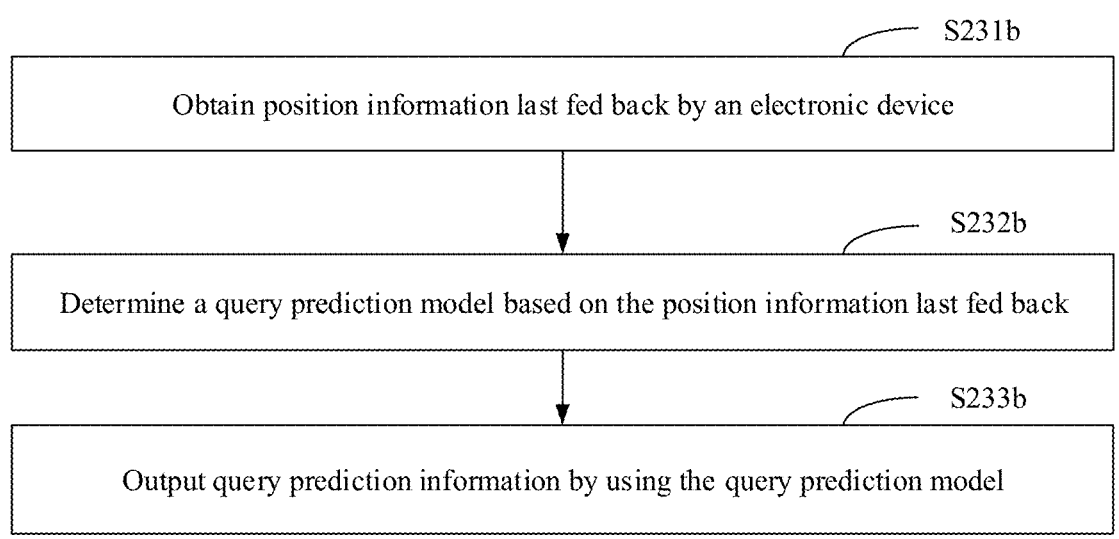
FIG. 5b is a flowchart of a specific implementation of S23 according to Embodiment 2 of this application.

FIG. 5b is a flowchart of a specific implementation of each step in Implementation 2 of S23. Refer to FIG. 5b. In this embodiment, S23 may include S231b to S233b. Details are as follows:

S231b: The prediction server obtains the position information recently fed back by the electronic device.

Specifically, the prediction server may extract, from the historical data of the electronic device, the position information recently fed back. "Recently fed back" specifically indicates that a difference between a corresponding report moment when the electronic device reports the position information and a moment when the terminal device sends the positioning query request is the smallest, and when the difference is the smallest, the position information is "recently fed back". The prediction server may identify the position information recently fed back by the electronic device as a reference position.

S232b: Select the associated query prediction model based on the position information recently fed back.

Specifically, the prediction server may be configured with at least one query prediction model, and output the query prediction information by using the query prediction model. Different query prediction models may be used in different scenarios, and different prediction manners are used in different scenarios. This improves accuracy of the prediction operation.

A manner of determining, based on the position information recently fed back, the query prediction model may be as follows: The prediction server may identify, from all the historical data, a quantity of historical data that is the same as or similar to the position information recently fed back. For a manner of collecting statistics on the same or similar historical data, refer to the foregoing content. In other words, if identifying that a difference corresponding to the report moments is less than the preset time threshold, and the distance value between the two positions is less than the preset distance threshold, the prediction server identifies the historical data that is the same as or similar to the reference position. If the quantity of historical data is greater than the preset quantity threshold, the prediction server identifies that the user to which the electronic device belongs is in a daily scenario, and uses a first query prediction model. If the quantity of historical data that is the same as or similar to the reference position is less than or equal to the quantity threshold, the prediction server identifies that the user to which the electronic device belongs is in an unconventional scenario, and uses a second query prediction model.

S233b: Output the query prediction information by using the query prediction model.

Specifically, when outputting the prediction result by using the first query prediction model, the prediction server may select historical data, on a plurality different dates, whose historical data report moment is close to the moment of receiving the query positioning request as the reference data, import the selected reference data into the first query preset model, and output the query prediction information. Because when the first query prediction model is used, it indicates that the user to which the electronic device belongs is in the daily scenario, in this case, the prediction server may determine, based on the plurality of pieces of historical data on the different dates, the signal strength at the prediction position of the electronic device, import the signal strength at the prediction position and the historical response duration in the historical data into the first query prediction model, and generate the query prediction information. The query prediction information may include one or a combination of at least two of the query response duration (namely, waiting time required by the terminal device), the positioning success rate, prediction accuracy, and the like.

By way of example, and not limitation, the user to which the terminal device belongs is a father, and the user to which the electronic device belongs is a daughter. When obtaining the position information of the daughter at 15:00 p.m., the father may send the positioning query request to the service server on the terminal device, and the service server may generate one prediction request to the prediction server. The prediction server obtains, through query, that the historical data recently fed back by the electronic device is historical data fed back at 14:58 p.m. The reference position of the historical data is a school. The prediction server may collect, from all the historical data, statistics on a quantity of historical data that is about 14:58 p.m. on different dates and whose positioning position is the school. If determining that the quantity is greater than the preset quantity threshold, the prediction server may identify that the daughter is currently in the daily scenario, and output the query prediction information by using the first query prediction model. In this case, the prediction server imports the historical data, on different dates, whose feedback moment is around 15:00 p.m. to the first query prediction model, and outputs the query prediction information.

Specifically, when outputting the prediction result by using the second query prediction model, the prediction server may select the historical data corresponding to the time difference between the moment of reporting the historical data and the moment of receiving the query positioning request less than the preset time threshold as the reference data. A date of reporting the reference data is the same as a date of receiving the query positioning request. The prediction server imports the selected reference data into the second query preset model, and outputs the query prediction information. Because when the second query prediction model is used, it indicates that the user to which the electronic device belongs is in the unconventional scenario and current user behavior is not daily regular behavior, and is occasional behavior, in this case, the prediction server may predict, based on a plurality of pieces of historical data recently fed back by the electronic device, the signal strength at the current position of the electronic device, import, into the second query prediction model, a signal state at the prediction position and response duration of recent several times of feeding back the position information, and generate the query prediction information. The query prediction information may include one or a combination of at least two of the query response duration (namely, waiting time required by the terminal device), the positioning success rate, prediction accuracy, and the like.

By way of example, and not limitation, the user to which the terminal device belongs is a father, and the user to which the electronic device belongs is a daughter. When obtaining the position information of the daughter at 15:00 p.m., the father may send the positioning query request to the service server on the terminal device, and the service server may generate one prediction request to the prediction server. The prediction server obtains, through query, that the historical data recently fed back by the electronic device is historical data fed back at 14:58 p.m., where the reference position of the historical data is a high-speed railway station. The prediction server may collect, from all historical data, statistics on a quantity of historical data that is about 14:58 p.m. on different dates and whose positioning position is the high-speed railway station, and identify that the quantity is less than the preset quantity threshold. However, the daughter should be in the school around 14:58 p.m. on the different dates. Therefore, the prediction server can identify that the daughter is currently in the unconventional scenario, and output the query prediction information by using the second query prediction model. In this case, the prediction server imports the historical data, on a current date, corresponding to the time difference between the feedback moment and 15:00 p.m. less than the preset time threshold into the second query prediction model, for example, if the time threshold is 30 minutes, imports historical data between 14:30 p.m. and 15:00 p.m. into the second query prediction model, and outputs the query prediction information.

In a possible implementation, after determining the query prediction model, and before outputting the query prediction information by using the query prediction model, the prediction server may determine, based on the position information in the historical data recently fed back by the electronic device, prediction behavior of the user to which the electronic device belongs, adjust the query prediction model based on the prediction behavior, and generate the query prediction information by using a query prediction model obtained after the adjustment. By way of example, and not limitation, if the position information in the historical data recently fed back by the electronic device indicates a high-speed railway station, the user to which the electronic device belongs may need to take a high-speed railway next, that is, the corresponding prediction behavior may be "taking a high-speed railway", and the prediction server adjusts the query prediction model to a query prediction model in a high-speed railway collection mode based on the prediction behavior. For another example, if the position information in the historical data recently fed back by the electronic device indicates an airport, the user to which the electronic device belongs may need to take an airplane next, and a passenger on the airplane cannot freely perform communication. In this case, corresponding prediction behavior may be "taking an airplane", and the prediction server adjusts, based on the prediction behavior, the query prediction model to a query prediction model in a scenario in which communication cannot be performed.

A specific implementation procedure of Implementation 2 is described by determining the query waiting duration and the positioning success rate in the query prediction information. The prediction server may determine, based on the position information in the historical data recently fed back by the electronic device, the query prediction model associated with the position information, and output, by using the query prediction model, a plurality of candidate prediction positions of the electronic device and confidence corresponding to the candidate prediction positions. Optionally, if the historical data includes a motion parameter, the prediction server may further import the motion parameter into the query prediction model. The query prediction model may generate a plurality of movement tracks based on the position recently fed back by the electronic device and a running parameter. Because the query prediction model is obtained through big data analysis based on all the historical data of the electronic device, the query prediction model may determine the behavior habit of the user to which the electronic device belongs. Therefore, in addition to the movement track, a matching degree between each movement track and a behavior habit of the user to which the electronic device belongs can be determined, and confidence corresponding to each movement track is determined based on the matching degree. Movement time of the electronic device may be determined based on the time difference between the feedback moment of the historical data recently fed back and the moment of receiving the prediction request, so that the prediction position of the electronic device can be marked at each movement track, and the confidence corresponding to each movement track is used as the confidence corresponding to the prediction position corresponding to the movement track.

Figure 5C:
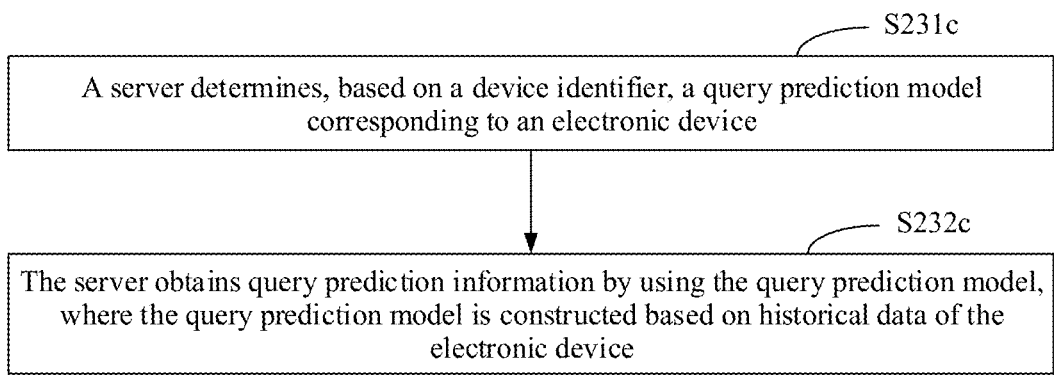
FIG. 5c is a flowchart of a specific implementation of S23 according to Embodiment 3 of this application.

FIG. 5c is a flowchart of a specific implementation of each step in Implementation 3 of S23. Compared with Implementation 2, Implementation 3 may configure corresponding query prediction models for different electronic devices. Therefore, the device identifier of the electronic device needs to be obtained before the query prediction model is obtained. Refer to FIG. 5. In this embodiment, S23 may include S231c and S232c. Details are as follows:

In S231c, the prediction server determines, based on the device identifier of the electronic device, the query prediction model corresponding to the electronic device.

In this embodiment, the prediction server may construct a query prediction model for each electronic device in advance. The prediction server uses the historical data of the electronic device as training data, and adjusts a preset algorithm model to generate the query prediction model.

The query prediction model may be constructed in the following three implementations:

In a possible implementation, the prediction server may separately configure corresponding query prediction models for different electronic devices. In this case, the prediction server divides the historical data into a plurality of data groups based on the device identifier of the electronic device, and trains the query prediction model based on historical data in each data group to generate the query prediction model matching the behavior habit of the electronic device.

In a possible implementation, the prediction server may further generate, based on historical data fed back by all different electronic devices, a query prediction model that can be applied to all the devices, that is, the generated query prediction model may be used to output query prediction information of the different electronic devices. In this case, the prediction server may use the historical data of all the different electronic devices as training data, and train and learn a preset algorithm model. The historical data of all the electronic devices is used as the training data. This can greatly increase a quantity of samples of the training data, and improve accuracy of the query prediction model.

In a possible implementation, the prediction server may construct the query prediction model by combining the foregoing two manners. An implementation is specifically as follows: The prediction server may construct, based on the historical data of all electronic devices, a reference prediction model applicable to all the devices. The prediction server may obtain a data volume of historical data of each electronic device in a preset detection period. If detecting that a data volume of historical data of any electronic device is greater than a preset data volume threshold, the prediction server configures a query prediction model corresponding to the electronic device for the electronic device based on all historical data of the electronic device. Therefore, when receiving the positioning query request sent by the terminal device, the prediction server determines whether the associated query prediction model is configured for the electronic device indicated in the positioning query request; and if the associated query prediction model is configured for the electronic device, generates the query prediction information by using the query prediction model associated with the electronic device; or if no associated query prediction model is configured for the electronic device, outputs the query prediction information by using the reference prediction model applicable to all the devices.

When the query prediction mode is trained based on the historical data, the prediction server may extract, from the historical data, a parameter related to construction of the query prediction model. The parameter includes but is not limited to one or a combination of at least two of the following: An on/off state of the electronic device, report time of the historical data, a motion state of the electronic device, online duration of a long link between the electronic device and the service server, a historical success rate of a heartbeat signal sent by the electronic device when the long link is maintained, signal strength corresponding to a report moment of the historical data, and a network state corresponding to the report moment (for example, feedback is performed through a mobile communications network or a wireless local area network). The prediction server may further extract, from the historical data, a related parameter output by the query prediction model. The parameter includes but is not limited to one or a combination of at least two of the following: actual positioning duration, an actual positioning feedback state (for example, a positioning success state or a positioning failure state), a feedback position, and the like.

A manner of training the query prediction model may be specifically as follows: The prediction server may extract, from the historical data, a plurality of training input parameters and training output parameters related to the query prediction information, and form a plurality of training samples by using the training input parameters and the training output parameters. The prediction server may configure, based on a data type of a prediction parameter in the query prediction information, a basic prediction model corresponding to the prediction parameter, and adjust a learning parameter in the basic prediction model by using the plurality of generated training samples, so that a loss function of a basic prediction model obtained after adjustment is less than a preset loss threshold. In this case, it may be identified that learning of the basic prediction model is completed, and a basic prediction mode obtained after learning is identified as the query prediction model. The foregoing manner of adjusting the basic prediction model includes but is not limited to one or a combination of the following: The prediction server adjusts levels included in the basic prediction model, for example, increases or decreases a corresponding quantity of nodes. The prediction server performs classification prediction on an output result through linear classification, separately calculates a probability value corresponding to each classification result, and optimizes a quantity of classification results in an adjustment process. The prediction server adjusts a prediction algorithm of the basic prediction model in a multivariate linear fitting manner, and configures an upper limit level for each input element, to avoid overfitting in a fitting process.

In a possible implementation, a manner of generating the reference prediction model may be specifically as follows: The service server may query the prediction parameter included in the prediction information. For example, the query prediction information includes the query waiting duration and the positioning success rate. Different prediction parameters correspond to different input data. In this case, the prediction server may configure corresponding query prediction algorithms for different prediction parameters, configure corresponding input parameters for the query prediction algorithms, and encapsulate the plurality of query prediction algorithms to obtain the reference prediction model. It should be noted that the reference prediction model is used to determine a general function expression used in the model. A weight value of each variable in the general function expression needs to be adjusted in a training and learning manner. In other words, the reference prediction model is used to limit a conversion relationship between an independent variable and a dependent variable. For example, the query prediction information includes two prediction parameters: the query waiting duration and the positioning success rate. Input parameters corresponding to the query waiting duration may be positioning query time, a historical motion state, historical signal strength, and a historical network state. The first query prediction algorithm corresponding to the query waiting duration may be constructed through fitting in a multivariate linear regression manner based on the four parameters. Input parameters corresponding to the positioning success rate may be positioning query time, a device historical state, a heartbeat signal receiving success rate, and a historical network state. The second query prediction algorithm corresponding to the positioning success rate may be constructed through fitting in the multivariate linear regression manner based on the four parameters. The foregoing two query prediction algorithms are encapsulated to generate the reference prediction model.

In S232c, the prediction server obtains the query prediction information by using the query prediction model, where the query prediction model is constructed based on the historical data of the electronic device.

In this embodiment, after obtaining the query prediction model through construction based on the historical data of the electronic device, the prediction server may generate, by using the query prediction model, the query prediction information corresponding to the positioning query request. The input parameter of the query prediction model may be request trigger time of the query prediction request, the associated target historical data extracted from the historical data of the electronic device is imported into the query prediction model, and the query prediction information is output by using the query prediction model.

In a possible implementation, the target historical data selected from the historical data may be the historical data recently fed back by the electronic device, that is, the historical data corresponding to the smallest time difference between the report time at which the electronic device reports the historical data and the request trigger time of the query prediction request is used as the target historical data. The signal strength and the network state that correspond to the historical position are determined based on the historical position carried in the target historical data, and the two parameters are imported into the query prediction model to predict a parameter such as time consumed for making the response to the query operation and generate the query prediction information. It should be noted that the parameter item extracted from the target historical data is determined by the input parameter of the query prediction model. There may be one or more pieces of the obtained target historical data. This is not specifically limited.

In this embodiment of this application, the query prediction model is constructed based on the historical data fed back by the electronic device in the use process, and the query prediction information is output by using the query prediction model. This can predict the operation process parameter of the positioning query operation, adjusts the model by using big data, and improves accuracy of the prediction operation.

Figure 6:
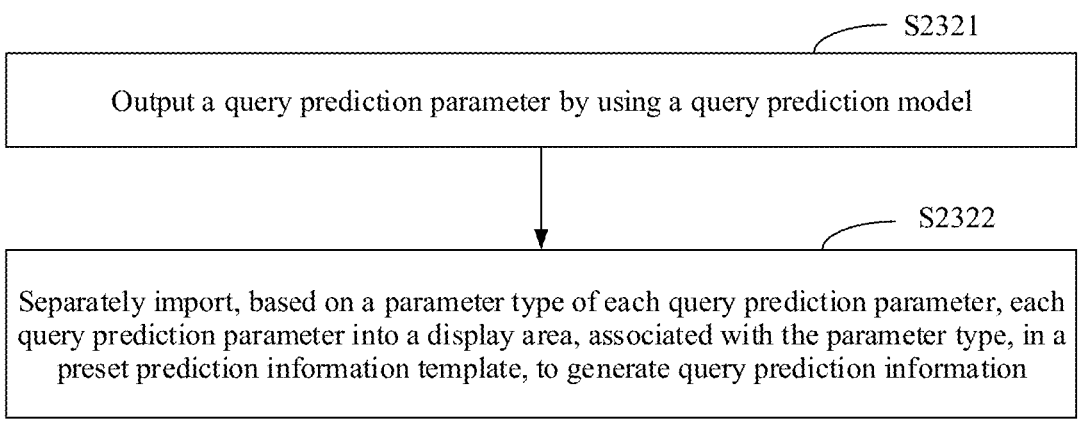
FIG. 6 is a flowchart of a specific implementation of S232 according to an embodiment of this application.

Further, in another embodiment of this application, the query prediction information may further include a plurality of different query prediction parameters, and corresponding display areas are configured for the different query prediction parameters. In this case, S232c in the embodiment in FIG. 5c may include S2321 and S2322. FIG. 6 including operations of S2321 and S2322 is a flowchart of a specific implementation of S232c when the query prediction information has the display areas according to this embodiment of this application. Details are as follows:

In S2321, the prediction server outputs the query prediction parameters by using the query prediction model.

In this embodiment, the query prediction information includes the plurality of query prediction parameters, and the different query prediction parameters may be used to represent prediction information in different dimensions. By way of example, and not limitation, the query prediction parameter includes but is not limited to one or a combination of at least two of the following: query waiting duration, a positioning success rate, a prediction position, query of a scenario of a user, a device state of the electronic device, and the like. Query of the scenario of the user may be represented by using a scenario type, for example, a school type, a railway station type, or a shopping mall type. The scenario type does not include specific place information, but type information obtained through classification based on information such as a place at which the user located, an environment. The device state includes but is not limited to an on state, a standby state, a low-power state, a weak signal state, and the like. The prediction server extracts, from the historical data, the input parameters required for the query prediction model, imports each input parameter into the query prediction model, and outputs the query prediction parameters corresponding to the current positioning query operation.

By way of example, and not limitation, Table 2 shows a schematic diagram of comparison of structures of feedback packets based on the positioning query request according to this embodiment. Refer to Table 2. The feedback packet in the conventional positioning query technology carries a field about whether the positioning request is successfully sent. After the terminal device receives the feedback packet and before the terminal device receives the position information returned by the electronic device, only a message indicating that the position is successfully sent is displayed in the display interface of the terminal device. The user cannot determine the time required for the current query operation. As a result, the user needs to wait for the query result in the current page for a long time. However, in the feedback packet provided in this embodiment (because the query prediction information is fed back in this embodiment, the feedback packet carries the query prediction parameters in the query prediction information), in addition to the field about whether the positioning request is successfully sent, fields related to the query prediction parameters may be carried. The fields are a field about an accessible state of the positioning result, a field about the prediction positioning success rate, a field about the query waiting duration, and a field about the device current scenario. After receiving the feedback packet, the terminal device can display the information of the fields about the query prediction parameters in the current interface, so that the user can conveniently determine the time required for the current query operation, thereby facilitating adjustment of a subsequent operation.

TABLE 2

| | Conventional technology of a method for positioning the electronic device | Method for positioning the electronic device provided in this embodiment |
| --- | --- | --- |
| Structure of a feedback packet | Field about the state of the positioning request | Field about the state of the positioning request<br>Field about the accessible state of the positioning result<br>Field about the prediction positioning success rate<br>Field about the query waiting duration<br>Field about the device current scenario |

In S2322, the prediction server separately imports, based on a parameter type of each query prediction parameter, each query prediction parameter into a display area, associated with the parameter type, in a preset prediction information template, to generate the query prediction information.

In this embodiment, the prediction server may pre-configure the prediction information template. The corresponding display areas are configured for different types of query prediction parameters in the prediction information template. After obtaining each query prediction parameter through outputting by using the query prediction model, the prediction server may determine a display area on the prediction information model, and import each query prediction parameter into the associated display area, to generate the corresponding query prediction information.

In a possible implementation, the query prediction information is specifically output in the query prediction display interface. The prediction server is pre-configured with an interface template, and associated interface display areas are configured for different types of parameters. The prediction server identifies a parameter type of each query prediction parameter, imports the query prediction parameter into the interface template based on an interface display area associated with each parameter type to generate the query prediction information. After the query prediction information is fed back to the terminal device, the terminal device may output the prediction display interface in the local display interface.

Figure 7:
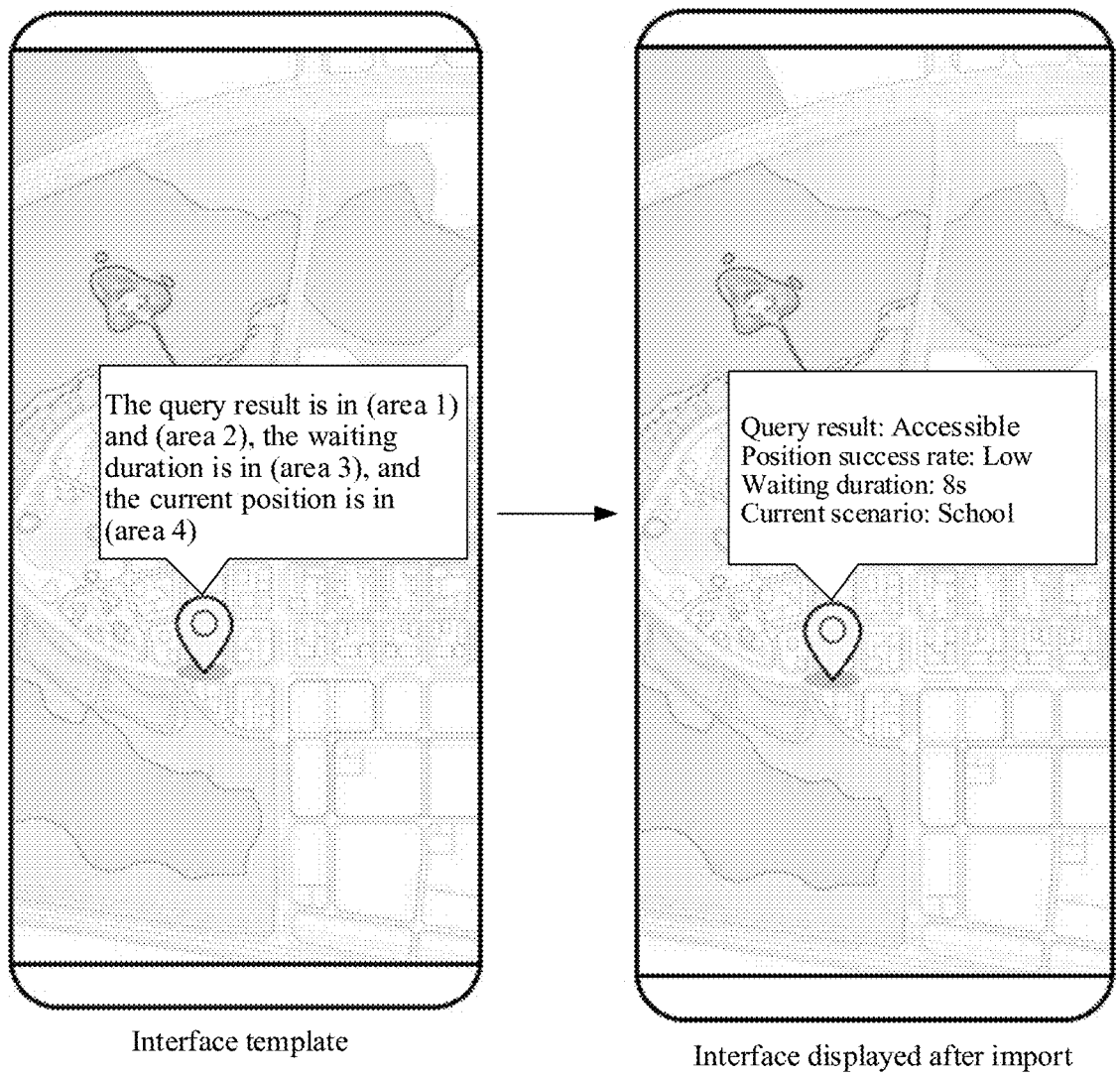
FIG. 7 is a schematic diagram of an interface template of a query prediction display interface according to an embodiment of this application.

By way of example, and not limitation, FIG. 7 is a schematic diagram of the interface template of the query prediction display interface according to this embodiment of this application. Refer to FIG. 7. The output query prediction parameters include the field about the accessible state of the positioning result, the field about the prediction positioning success rate, the field about the query waiting duration, and the field about the device current scenario. Parameter values corresponding to the four fields are respectively "accessible positioning result", "low positioning success rate", "8 seconds" and "school scenario". Display areas corresponding to the four fields are an area 1, an area 2, an area 3, and an area 4. The prediction server can import the four parameter values to corresponding areas in the interface template.

In this embodiment of this application, the prediction query model is identified to output the plurality of query prediction parameters of different parameter types, and the query prediction parameters are imported into the display areas associated with the prediction information template, to generate the query prediction information. The query prediction information is returned to the terminal device, so that the terminal device can output the query prediction information in a preset display manner. This improves readability of the query prediction information.

Figure 8:
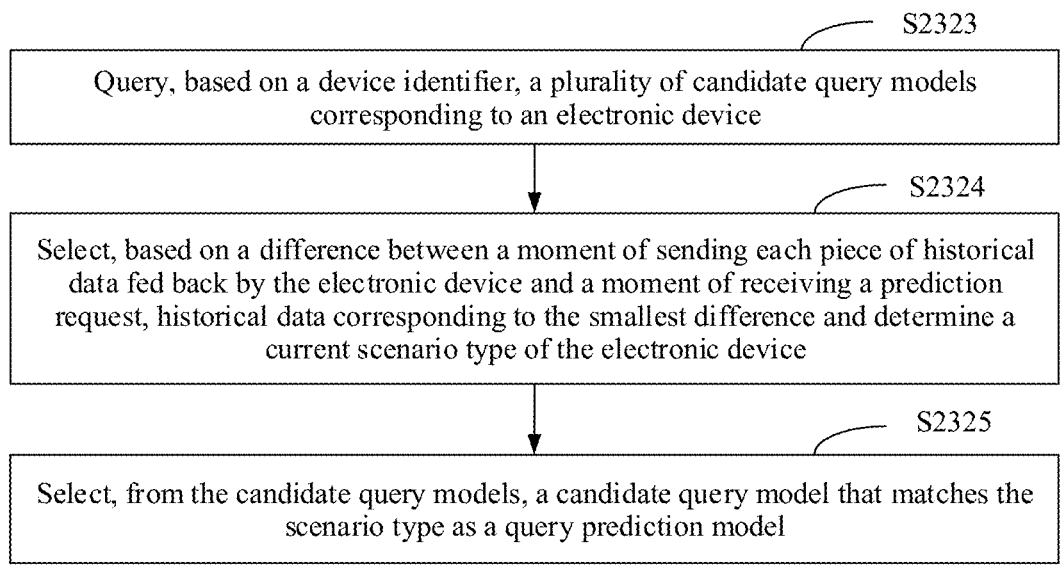
FIG. 8 is a flowchart of a specific implementation of S232 according to an embodiment of this application.

Further, in another embodiment of this application, when one electronic device corresponds to a plurality of query prediction models, in this case, S232*c* in the embodiment of FIG. 5*c* may include the following related operations of S2323 to S2325. FIG. 8 including operations of S2323 to S2325 is a flowchart of a specific implementation of S232*c* when the electronic device corresponds to the plurality of query prediction models according to this embodiment of this application. Details are as follows:

In S2323, the prediction server queries, based on the device identifier, the plurality of candidate query models corresponding to the electronic device.

In this embodiment, the electronic device may configure the plurality of different query prediction models in different position scenarios.

In S2324, the prediction server determines a current scenario type of the electronic device based on the historical data, of the electronic device, corresponding to the smallest difference between the moment of feeding back the position information and the current moment.

In this embodiment, the current moment specifically indicates a corresponding moment when the prediction server receives the prediction request. The historical data corresponding to the smallest difference between the moment of feeding back the position information and the current moment is selected from the historical data. The prediction server may determine the position information recently fed back by the electronic device, and determine the used query prediction model based on the position information recently fed back, to use different prediction manners in different scenarios of the electronic device, thereby improving a success rate of the prediction operation. The prediction server may identify the position information recently fed back by the electronic device as a reference position. The prediction server may identify, from all the historical data, the quantity of historical data that is the same as or similar to the reference position. For a manner of collecting statistics on the same or similar historical data, refer to the foregoing content. In other words, if identifying that the difference corresponding to the moment of feeding back the position information is less than the preset time threshold, and the distance value between the two positions fed back in the historical data is less than the preset distance threshold, the prediction server identifies the historical data that is the same as or similar to the reference position. If the quantity of historical data is greater than the preset quantity threshold, the prediction server identifies that the user to which the electronic device belongs is in the daily scenario. If the quantity of historical data that is the same as or similar to the reference position is less than or equal to the quantity threshold, the prediction server identifies that the user to which the electronic device belongs is in the unconventional scenario.

In S2325, the prediction server selects from the candidate query models, a candidate query model that matches the scenario type as the query prediction model.

In this embodiment, the prediction server may select the candidate query model that matches the current scenario of the electronic device as the query prediction model for outputting the query prediction information.

In this embodiment of this application, different prediction manners are used in different scenarios of the electronic device, thereby improving the success rate of the prediction operation.

Further, in another embodiment of this application, when the output prediction result corresponding to the query prediction information is the positioning failure state, the query prediction information may include the positioning failure reason and/or the prediction position. In this case, after S23 in the embodiment in FIG. 5*c*, operations of S901 to S904 are further included. FIG. 9 is a flowchart of a response made when the output prediction result corresponding to the query prediction information is the positioning failure state according to this embodiment of this application. Refer to FIG. 9. In this embodiment, S901 to S904 may be included after S23, and details are described as follows:

In S901, if the prediction result corresponding to the query prediction information is the positioning failure state, the prediction server selects, based on the difference between the moment of sending each piece of historical data fed back by the electronic device and the moment of receiving the prediction request, the historical data corresponding to the smallest difference as the target data.

In this embodiment, the current moment specifically indicates a corresponding moment when the prediction server receives the prediction request. The query prediction information includes a prediction query state, and the prediction query state includes but is not limited to: a success state and the positioning failure state. When the prediction server detects that the prediction result corresponding to the query prediction information is the positioning failure state, it indicates that the current moment is very likely to be in a communication failure environment through inferring based on the historical data of the electronic device. In this case, when the positioning query instruction is sent to the electronic device, there is a high probability that the terminal device cannot receive, within the preset valid response time, the position information fed back by the electronic device. Based on this, to enable the terminal device to obtain the position information of the electronic device at the current moment, the prediction position of the electronic device is determined by using the query prediction model, and/or the positioning failure reason is output to the user, so that the user can also predict the current state of the electronic device.

It should be noted that, when identifying that the prediction result is the positioning failure state, the prediction server may still send the positioning query instruction to the electronic device, and if receiving, within the valid response time, the position information fed back by the electronic device according to the positioning query instruction, the prediction server generates the positioning query result, and feeds back the positioning query result to the terminal device.

In this embodiment, when detecting that the prediction result corresponding to the query prediction information is the positioning failure state, the prediction server may output the positioning failure reason and/or the current prediction position of the electronic device. In this case, the prediction server needs to select the corresponding target data from the historical data to determine the foregoing two query prediction parameters. The target data is historical data recently fed back by the electronic device, namely, the historical data corresponding to the smallest difference between the feedback moment and the current time.

In this embodiment, each piece of historical data carries information such as a running state, signal strength, a current position, and/or a motion state of the device at a moment when the electronic device feeds back the historical data. The running state specifically indicates a hardware state of the device, for example, the device is in an on state, an off state, a low-power state, an overloaded state, or an unloaded state. The motion state of the device specifically indicates a physical motion state of the device. Because the electronic device may be a wearable device, a mobile terminal, or an automatic robot, and moves with the user to which the electronic device belongs or a preset program, the motion state may include a static state and a motion state. The motion state further corresponds to a motion speed, a motion angular velocity, a motion acceleration, and the like.

In S902, the prediction server outputs the positioning failure reason based on the running state and the signal strength that are carried in the target data and that correspond to the electronic device at the moment of feeding back the position information.

In this embodiment, the server may extract, from the target data, the running state and the signal strength of the electronic device at the feedback moment, and determine, based on the two parameters, the reason why the current prediction result of the electronic device is that the electronic device cannot be positioned.

In a possible implementation, a manner of determining the positioning failure reason may be as follows: If the running state in the target data is the off state, the corresponding positioning failure reason may be that the device is off. If the running state in the target data is the low-power state, the corresponding positioning failure reason may be that power of the device is insufficient. If the running state in the target data is the on state, a value of the signal strength is identified, and if a value of the signal strength is less than a preset signal feedback threshold, the corresponding positioning failure reason may be that the device has no network.

In S903, the prediction server outputs the prediction position based on the historical position and the motion state that are carried in the target data and that correspond to the electronic device at the feedback moment.

In this embodiment, the prediction server may extract, from the target data, the historical position and the motion state that are of the electronic device at the feedback moment, and predict the current position of the electronic device, namely, the prediction position, based on the two parameters.

In a possible implementation, a manner of determining the preset position may be as follows: If the motion state is a static state, the historical position in the target data is the current prediction position of the electronic device. If the motion state is a movement state, a movement speed is determined, a movement distance is obtained through calculation based on a difference between the feedback moment and the current moment, and the prediction position is determined based on the movement distance and the historical position. Particularly, a movement process is definitely on a feasible road. Therefore, position coordinates may be accurately determined based on a road on which the historical position is located and a movement direction of the user, and a coordinate point corresponding to the position coordinates is used as the prediction position.

Figure 10:
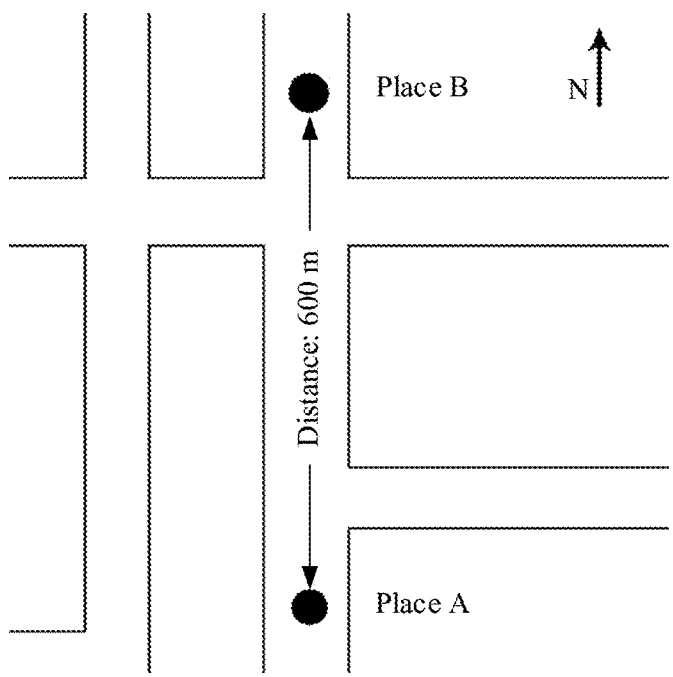
FIG. 10 is a schematic diagram of determining a prediction position according to an embodiment of this application.

By way of example, and not limitation, FIG. 10 is a schematic diagram of determining the prediction position according to an embodiment of this application. It may be determined, based on the target data, that a position of the electronic device at 15:00 p.m. is a place A, and the electronic device moves in a due north direction at a speed of 2 meters per second. At 15:05 p.m., the prediction server receives the positioning query request sent by the terminal device, and determines that positioning of the electronic device fails at current time. In this case, a movement distance may be obtained through calculation based on the movement speed and movement time, that is, 2*5*60=600 m, and the movement direction is the due north direction. In this case, a place B is 600 meters away from the north of the place A, and the place B is used as the prediction position.

It should be noted that either S902 or S903 may be performed, S902 and S903 may be performed synchronously, or S902 and S903 may be performed sequentially based on a preset sequence. The two steps are independent of each other, and an execution sequence between the two steps is not limited herein.

In S904, the prediction server imports the positioning failure reason and/or the prediction position into the query prediction information.

In this embodiment, after determining the positioning failure reason and the prediction position, the prediction server may import the two parameters into the query prediction information, so that after receiving the query prediction information, the user can output the positioning failure reason and the prediction position on the terminal device to determine a current exception state of the electronic device.

By way of example, and not limitation, in a process from 15:00 p.m. to 15:20 p.m., the electronic device maintains a long link to the prediction server, feeds back heartbeat data to the prediction server in a preset feedback period, makes response to, at 15:20 p.m., to the positioning query instruction sent by the prediction server, and feeds back position information at 15:20 p.m. to the prediction server. The position information indicates that the electronic device is near a tunnel. At 15:21 p.m., the terminal device sends, to the prediction server, the query request used to obtain the position of the electronic device. In this case, the prediction server detects a state of the connection to the electronic device, and finds that an interaction state between the electronic device and the prediction server is normal, the long link is currently in a connection state, but heartbeat data fed back by the electronic device has not been received for one minute, and position information sent by a watch at a previous feedback moment indicates that the watch is currently in an on state, is connected to a mobile network, and is moving towards the tunnel at a speed of 2 meters per second. In this case, the prediction server determines, by using the query prediction model, that the electronic device cannot connect to a network because the electronic device is in a tunnel scenario, and because the tunnel has a specific length, the prediction server predicts that the device cannot leave the tunnel within the valid response duration. In this case, the prediction server generates the query prediction information about a positioning failure; determines that the positioning failure reason is specifically "no network in the tunnel" and the prediction position is 120 m away from a tunnel entrance; and imports the foregoing information to the query prediction information.

In this embodiment of this application, when it is detected that the prediction result is the positioning failure, the positioning failure reason and the prediction position are obtained, so that the current state of the electronic device can be obtained through prediction by the query prediction model, and the terminal device learns exception to some extent, thereby improving user experience.

In S24, the service server sends the query prediction information to the terminal device.

In this embodiment, after obtaining the query prediction information, the service server may send the query prediction information to the terminal device.

In S25, the terminal device displays the query prediction information.

In this embodiment, the terminal device may display the query prediction information, for example, enable the user to determine the success rate of the current query operation based on the query prediction information, and determine, based on the query success rate, whether to wait for the query result in the query interface.

Compared with the conventional technology for positioning the electronic device, this solution has the following advantages. After sending the positioning query request, the terminal device first displays the query prediction information instead of the positioning query result. Compared with the positioning query result, the query prediction information is generated at a relatively high speed. Therefore, after the user sends the positioning query request, the query prediction information can be output without waiting for a relatively long time, and the success rate of the current query operation is determined; and after receiving the position information of the electronic device sent by the service server, the terminal device outputs the positioning query result. This is a step-by-step display process, so that the user can be prevented from unnecessary waiting, and have a psychological expectation on the query result.

Figure 11:
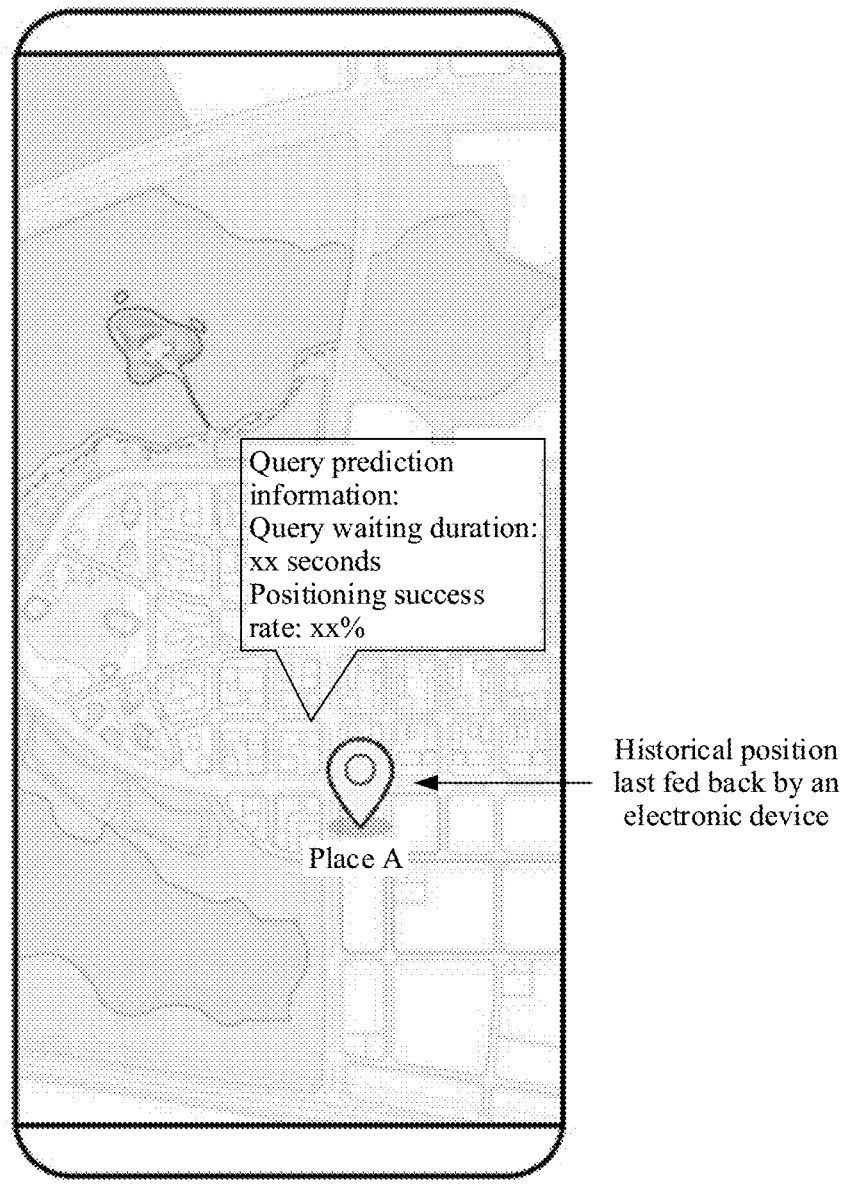
FIG. 11 is a schematic diagram of an output of query prediction information according to an embodiment of this application.

By way of example, and not limitation, FIG. 11 is a schematic diagram of an output of the query prediction information according to this embodiment of this application. Refer to FIG. 11. After the service server feeds back the query prediction information to the terminal device, the terminal device may display the received query prediction information in the preset query interface. The query prediction information includes the query waiting duration and the positioning success rate. The user may determine, based on the query prediction information displayed on the terminal device, the time consumption state of the current query operation, and determine whether to continue to stay in the query interface to wait for the positioning query result. The user may further determine, in the query interface based on the historical data recently fed back by the electronic device, the position of the electronic device at the previous feedback moment, namely, the place A. In a process in which the electronic device moves at a low speed, the current position should be near the place A. Therefore, the position of the electronic device obtained at the previous feedback moment is marked, so that the user can easily have an expectation on a general range of the position of the electronic device.

Figure 12:
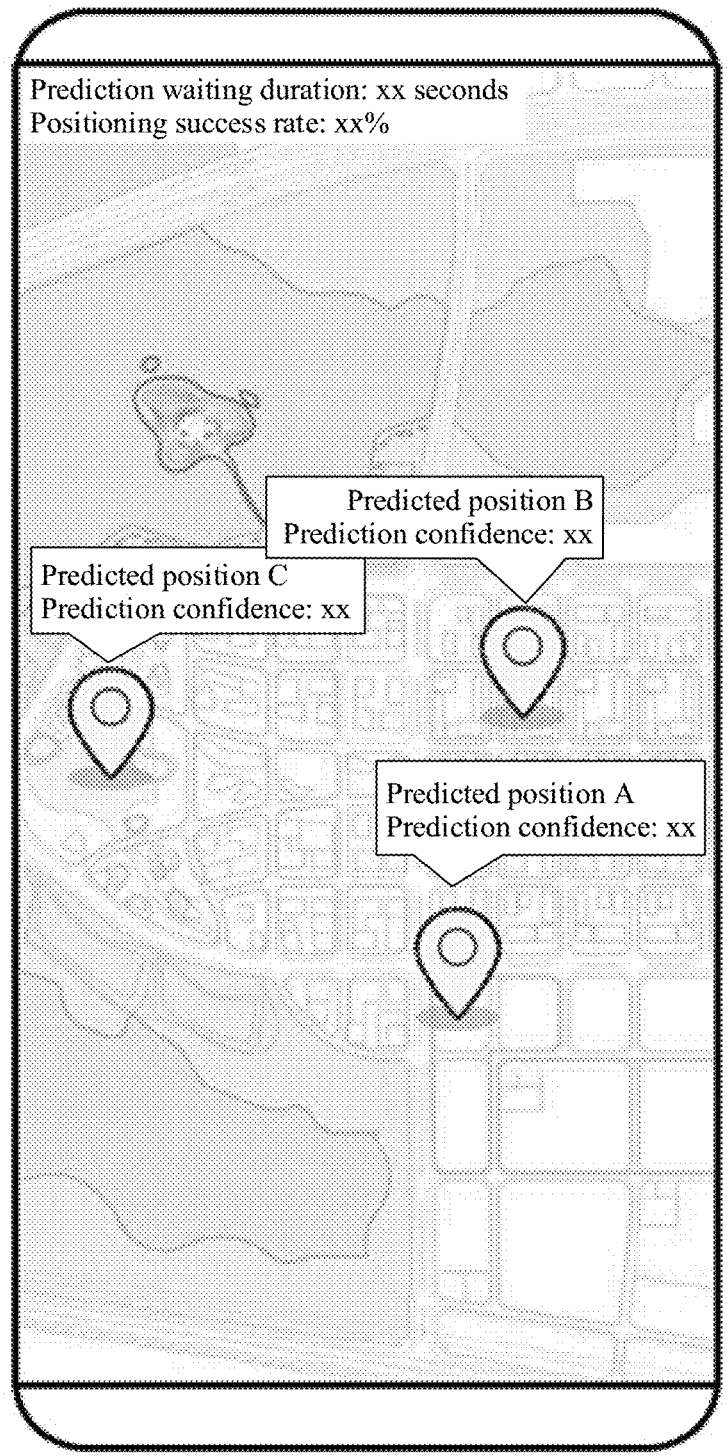
FIG. 12 is a schematic diagram of another output of query prediction information according to an embodiment of this application.

By way of example, and not limitation, FIG. 12 is a schematic diagram of an output of the query prediction information according to this embodiment of this application. Refer to FIG. 12. After the service server feeds back the query prediction information to the terminal device, the terminal device may display the received query prediction information in the preset query interface. The query prediction information includes query waiting duration, a positioning success rate, prediction positions, and prediction confidence corresponding to each prediction position. The prediction confidence is used to determine accuracy of each prediction position, and may be determined based on a quantity of historical data of the electronic device corresponding to the prediction position. A larger quantity of historical data corresponding to the electronic device at the prediction position corresponds to higher prediction confidence. The user may determine, based on the query prediction information, the time consumed for response of the electronic device, and determine the behavior habit of the electronic device based on the query prediction information.

Further, in another embodiment of this application, if the prediction result corresponding to the query prediction information is the positioning failure state, the query prediction information further includes the positioning failure reason and the prediction position of the electronic device.

In this embodiment, when identifying that the prediction result corresponding to the query prediction information is the positioning failure state, the prediction server may further import the positioning failure reason and the prediction position into the query prediction information. The service server sends the query prediction information to the terminal device. After receiving the query prediction information, the terminal device may output the positioning failure reason and the prediction position on the terminal device to determine the current prediction state of the electronic device.

By way of example, and not limitation, in a process from 15:00 p.m. to 15:20 p.m., the electronic device maintains the long link to the service server, feeds back the heartbeat data to the server in the preset feedback period, makes response to, at 15:20 p.m., to the positioning query instruction sent by the service server, and feeds back the position information at 15:20 p.m. to the server. The position information indicates that the electronic device is near the tunnel. At 15:21 p.m., the terminal device sends, to the service server, the query request used to obtain the position of the electronic device, and the service server sends the prediction request to the prediction server. In this case, the service server detects the state of the connection to the electronic device, and feeds back the state of the connection to the prediction server. The prediction server determines that the interaction state between the electronic device and the server is normal, the long link is currently in the connection state, but the heartbeat data fed back by the electronic device has not been received for one minute, and the position information sent by the watch at the previous feedback moment indicates that the watch is currently in the on state, is connected to the mobile network, and is moving towards the tunnel at a speed of 2 meters per second. In this case, the prediction server determines, by using the query prediction model, that the electronic device cannot connect to the network because the electronic device is in the tunnel scenario, and because the tunnel has the specific length, the prediction server predicts that the device cannot leave the tunnel within the valid response duration. In this case, the prediction server generates the query prediction information about the positioning failure; determines that the positioning failure reason is specifically "no network in the tunnel", and the prediction position is 120 m away from the tunnel entrance; and imports the foregoing information to the query prediction information. The terminal device may output the foregoing information in the display interface, so that the user can estimate the current position of the electronic device.

In S26, the service server sends the positioning query instruction to the electronic device.

In this embodiment, the service server may send the positioning query instruction to the electronic device, so as to obtain the current position of the electronic device. Because the communications network environment of the electronic device is unspecified, the long link between the electronic device and the service server is unstable, and duration for feeding back the position information is relatively long. After receiving the positioning query request, the service server may send the positioning query instruction to the electronic device, so as to obtain the position information fed back by the electronic device. Based on this, when feeding back the query prediction information to the terminal device, the service server may generate the positioning query instruction according to a registered communications address of the electronic device, and sends the positioning query instruction to the electronic device, so as to obtain the position information of the electronic device. It should be noted that a process of sending the positioning query instruction to the electronic device and a process of outputting the query prediction information to the terminal device may be performed synchronously.

In S27, the electronic device feeds back the position information to the service server in response to the positioning query instruction.

In this embodiment, the electronic device may be equipped with the built-in positioning module, obtain the position information by using the positioning module, and send the position information to the service server.

In a possible implementation, the electronic device may send a heartbeat data packet to the service server in a preset heartbeat period.

It should be noted that, device energy consumption for the electronic device usually needs to be reduced, thereby improving a battery life capability of the electronic device. In this case, the electronic device may enable a communications module at a preset start period interval, connect to the service server by using the communications module, and receive a related instruction sent by the service server. Therefore, when the terminal device needs to obtain the positioning information of the electronic device, and cannot determine an enabling state of the communications module of the electronic device and cannot determine waiting duration required for next enabling of the communications module in a disabled state, based on this, the terminal device usually needs to wait for a long time for the electronic device to feed back the position information. In the conventional technology, in a process in which the terminal device establishes the long connection to the service server, if the position information fed back by the electronic device is not received within the preset time period, the terminal device determines that a response of the current position query operation fails, and the terminal device needs to resend a positioning query request. As a result, a success rate of obtaining the positioning query request is reduced. According to the method for positioning the electronic device provided in this embodiment, the query prediction information may be output to notify the user of exception waiting duration of the current query operation, so that the user can be prevented from repeatedly sending a positioning query request in a waiting process. Optionally, the service server may further adjust the maximum response duration based on the query waiting duration, thereby reducing a quantity of response failures and improving the success rate of making response to the position query request.

In S28, after receiving the position information sent by the electronic device, the service server generates the positioning query result based on the position information.

In this embodiment, the service server may encapsulate the position information of the electronic device to obtain the positioning query result, and send the positioning query result to the terminal device.

In a possible implementation, the service server may be configured with a query result template, determine, by extracting longitude and latitude information included in the position information, a corresponding coordinate point in a preset map interface, and generate the positioning query result based on the coordinate point, so as to mark, based on the coordinate point, the current position of the electronic device in the map interface corresponding to the terminal device.

Optionally, if the service server maintains an association relationship pre-configured by the terminal device (the association relationship is used to limit electronic devices to be queried by the terminal device, namely, an association relationship between the terminal device and the electronic devices), and there are a plurality of electronic devices bound to the terminal device in the association relationship. In this case, the service server may simultaneously obtain position information of the plurality of electronic devices bound to the terminal device, generate a plurality of positioning query results, and feed back the plurality of positioning query results to the terminal device. Certainly, the service server may also generate positioning query results of some electronic devices according to selection of the user, and feed back the positioning query results to the terminal device.

Further, in another embodiment of this application, after S28, the method may further include: The prediction server adjusts the query prediction model based on the position information fed back by the electronic device based on the positioning query request, where the query prediction model is used to output the query prediction information.

In this embodiment, after the service server receives the position information fed back by the electronic device, it indicates that the service server completes the positioning query operation. In this case, the service server may send the position information to the prediction server. The prediction server uses the received position information as the historical data of the electronic device, adjusts the query prediction model based on the position information, compares the current request response result with the previously output query prediction information to identify a loss value of the current prediction operation, and adjust the query prediction model based on the loss value. This can continuously optimize the query prediction model in a use process, and improve accuracy of the output result of the query prediction model.

In a possible implementation, the prediction server may determine, based on the difference between the time of receiving the position information and time of sending the positioning query instruction, the actual response duration for making response to the positioning query request this time, and identify the query waiting duration in the query prediction information output by using the query prediction model. The prediction server obtains a time difference between the actual response duration and the query waiting duration through calculation, determines a prediction loss value of the query prediction model based on the time difference, and adjusts the query prediction model based on the prediction loss value and a training loss value corresponding to the plurality of pieces of historical data, to optimize the query prediction model.

In this embodiment of this application, each time the position information fed back by the electronic device is obtained, the position information may be used as a training sample to readjust the query prediction model. This can improve prediction accuracy of the query training model, so that the query prediction information is more consistent with an actual situation, thereby further improving user experience.

Further, in another embodiment of this application, the historical data includes a heartbeat data packet fed back by the electronic device in a preset heartbeat period and/or historical positioning information fed back by the electronic device based on a historical query request.

In this embodiment, the electronic device may establish a long connection to the service server, and send the heartbeat data packet to the service server in the preset heartbeat period. The heartbeat data packet may include device state data, for example, information such as device power, a device network state, device signal strength, a device motion state, and position information. After receiving the heartbeat data packet, the service server may send the heartbeat data to the prediction server, and the prediction server stores all heartbeat data packets as the historical data of the electronic device.

In this embodiment, the terminal device may send the positioning query request to the service server. When being in a communicable state, the electronic device sends, to the service server, the position information fed back based on the positioning query request. After receiving the position information, the service server may send the position information to the prediction server. The prediction server may store historical positioning information in a historical response process. The historical positioning information may include the device state data, for example, the information such as device power, a device network state, device signal strength, a device motion state, and position information.

In this embodiment of this application, data, for example, the heartbeat data packet and the historical position information, fed back by the electronic device in the running process is collected and used as the historical data, so that a behavior pattern of the electronic device can be effectively inferred, thereby improving accuracy of the query prediction information.

In S29, the terminal device displays the positioning query result.

In this embodiment, after receiving the positioning query result fed back by the service server, the terminal device may display the positioning query result in the preset query interface, so as to help the user determine the position of the electronic device at the current moment.

Optionally, if the query page on the terminal device is running in a background, in a process of waiting for the query result, the user switches to another application interface to perform another operation, and the terminal device may store the received positioning query result in a buffer area. When the terminal device switches the query interface back for running at a frontend, the terminal device reads the positioning query result from the buffer area, and displays the positioning query result in the query interface.

In this embodiment of this application, when the positioning query request sent by the terminal device is received, the query prediction information corresponding to the positioning query request can be generated based on the historical data of the to-be-queried electronic device, and the query prediction information is output to the terminal device, so that the user can learn, based on the query prediction information, the prediction information such as the time consumed for query and the positioning success rate, so as to determine whether to continue to wait for the query result or perform the another operation on the terminal device, without the user keeping the query interface displayed at the frontend for a long time. This improves use efficiency of the terminal device and improves user experience.

Embodiment 2

Figure 13:
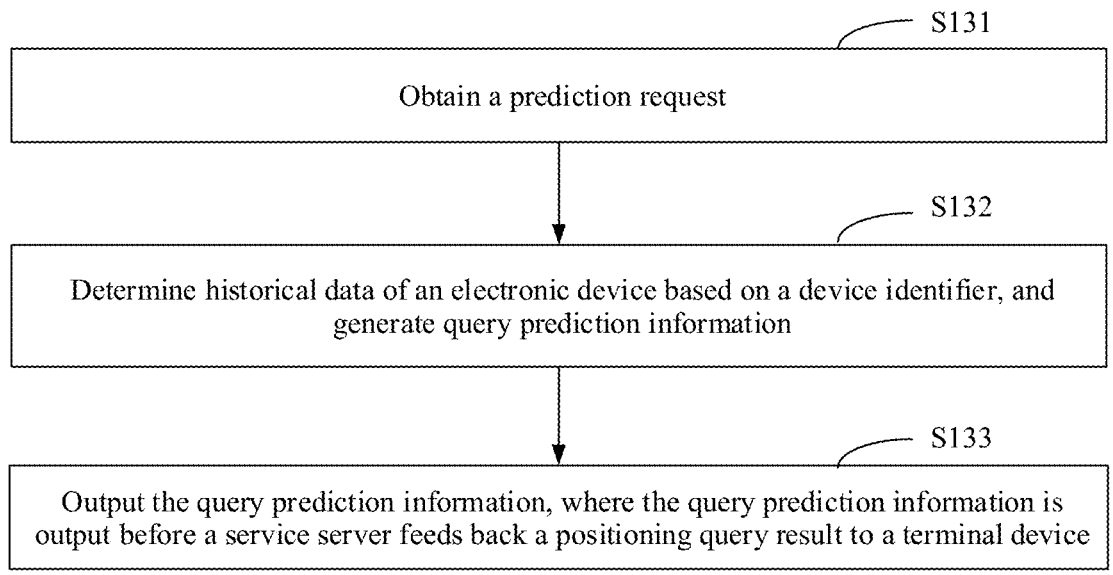
FIG. 13 is a flowchart of an implementation of a method for positioning an electronic device on a prediction server side according to an embodiment of this application.

In Embodiment 1, an implementation process of the method for positioning the electronic device is described from a perspective of interaction between four parties (the prediction server, the service server, the terminal device, and the electronic device). In Embodiment 2, the implementation process of the method for positioning the electronic device is described by using the prediction server as an execution body of a procedure. FIG. 13 is a flowchart of an implementation of the method for positioning the electronic device on a prediction server side according to this embodiment of this application. Details are as follows:

In S131, the prediction server obtains a prediction request, where the prediction request is generated based on a positioning query request sent by a terminal device, and the positioning query request carries a device identifier of the to-be-queried electronic device.

In S132, the prediction server determines historical data of the electronic device based on the device identifier, and generates query prediction information.

Further, in another embodiment of this application, the query prediction information includes query waiting duration, a positioning success rate, and/or at least one prediction position of the electronic device, and confidence corresponding to the prediction position.

Further, in another embodiment of this application, the historical data includes a heartbeat data packet fed back by the electronic device in a preset heartbeat period and/or historical positioning information fed back by the electronic device based on a historical query request.

Further, in another embodiment of this application, S132 includes the following steps:

The prediction server determines a prediction position of the electronic device based on the historical data of the electronic device.

The prediction server determines, based on the prediction position, signal strength corresponding to the electronic device at the prediction position.

The prediction server generates the query prediction information of the electronic device based on the signal strength.

Further, in another embodiment of this application, S132 includes the following steps:

The prediction server obtains position information recently fed back by the electronic device.

The prediction server determines a query prediction model based on the position information recently fed back.

The prediction server outputs the query prediction information by using the query prediction model.

Further, in another embodiment of this application, S132 includes the following steps:

The prediction server determines, based on the device identifier of the electronic device, a query prediction model corresponding to the electronic device.

The prediction server obtains the query prediction information by using the query prediction model, where the query prediction model is constructed based on the historical data of the electronic device.

Further, in another embodiment of this application, that the prediction server obtains the query prediction information by using the query prediction model includes:

The prediction server outputs a query prediction parameter by using the query prediction model.

The prediction server separately imports, based on a parameter type of each query prediction parameter, each query prediction parameter into a display area, associated with the parameter type, in a preset prediction information template, to generate the query prediction information.

Further, in another embodiment of this application, that the prediction server determines, based on the device identifier of the electronic device, the query prediction model corresponding to the electronic device includes:

The prediction server queries, based on the device identifier, a plurality of candidate query models corresponding to the electronic device.

The prediction server selects, based on a difference between a moment of sending each piece of historical data fed back by the electronic device and a moment of receiving the prediction request, historical data corresponding to the smallest difference and determines a current scenario type of the electronic device.

The prediction server selects from the candidate query models, a candidate query model that matches the scenario type as the query prediction model.

Further, in another embodiment of this application, after S132, the method further includes:

If a prediction result corresponding to the query prediction information is a positioning failure state, the prediction server selects, based on a difference between a moment of sending each piece of historical data fed back by the electronic device and a moment of receiving the prediction request, historical data corresponding to the smallest difference as target data.

The prediction server outputs a positioning failure reason based on a running state and signal strength that are carried in the target data and that correspond to the electronic device at a moment of feeding back position information.

The server imports the positioning failure reason into the query prediction information.

Further, in another embodiment of this application, after S132, the method further includes:

If a prediction result corresponding to the query prediction information is a positioning failure state, the prediction server selects, based on a difference between a moment of sending each piece of historical data fed back by the electronic device and a moment of receiving the prediction request, historical data corresponding to the smallest difference as target data.

The prediction server outputs a prediction position based on a historical position and a motion state that are carried in the target data and that correspond to the electronic device at a moment of feeding back position information.

The prediction server imports the prediction position into the query prediction information.

In S133, the prediction server outputs the query prediction information, where the query prediction information is output before the service server feeds back a positioning query result to the terminal device.

Further, in another embodiment of this application, after S133, the method may further include:

The prediction server adjusts the query prediction model based on position information fed back by the electronic device based on the positioning query request, where the query prediction model is used to output the query prediction information.

Figure 14:
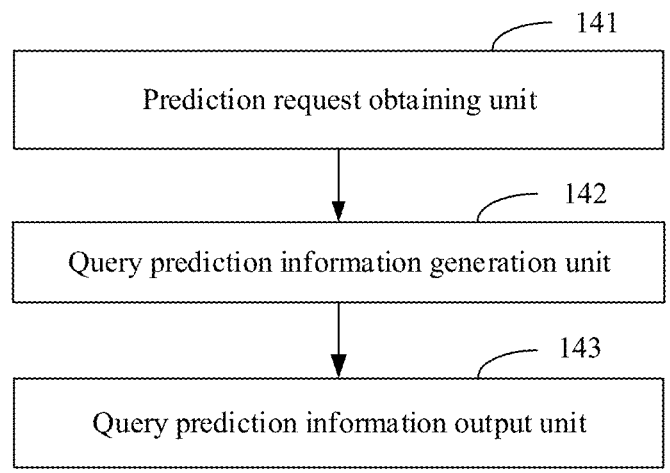
FIG. 14 is a block diagram of a structure of an apparatus for positioning an electronic device according to Embodiment 1 of this application.

Corresponding to the method for positioning the electronic device in the foregoing embodiment, FIG. 14 is a diagram of a structure of a virtual apparatus corresponding to the prediction server in the embodiment in FIG. 13 according to an embodiment of this application. For ease of description, only a part related to this embodiment of this application is shown.

Refer to FIG. 14. The virtual apparatus corresponding to the prediction server includes:

a prediction request obtaining unit 141, configured to obtain a prediction request, where the prediction request is generated based on a positioning query request sent by a terminal device, and the positioning query request carries a device identifier of a to-be-queried electronic device;

a query prediction information generation unit 142, configured to determine historical data of the electronic device based on the device identifier, and generate query prediction information; and a query prediction information output unit 143, configured to output the query prediction information, where the query prediction information is output before the service server feeds back a positioning query result to the terminal device.

Optionally, the query prediction information generation unit 142 includes:

a prediction position determining unit, configured to determine a prediction position of the electronic device based on the historical data of the electronic device;

a signal strength determining unit, configured to determine, based on the prediction position, signal strength corresponding to the electronic device at the prediction position; and a signal strength conversion unit, configured to generate the query prediction information of the electronic device based on the signal strength.

Optionally, the query prediction information generation unit 142 includes:

a recently-fed-back position obtaining unit, configured to obtain position information recently fed back by the electronic device;

a query prediction model obtaining unit, configured to determine a query prediction model based on the position information recently fed back; and a query prediction information determining unit, configured to output the query prediction information by using the query prediction model.

Optionally, the query prediction information generation unit 142 includes:
- a query prediction model determining unit, configured to determine, based on the device identifier of the electronic device, a query prediction model corresponding to the electronic device; and
- a query prediction model invoking unit, configured to obtain the query prediction information by using the query prediction model, where the query prediction model is constructed based on the historical data of the electronic device.

Optionally, the virtual apparatus corresponding to the prediction server further includes:
- a query prediction model adjustment unit, configured to adjust the query prediction model based on position information fed back by the electronic device based on the positioning query request, where the query prediction model is used to output the query prediction information.

Optionally, the query prediction model invoking unit includes:
- a query prediction parameter output unit, configured to output a query prediction parameter by using the query prediction model; and
- a query prediction parameter import unit, configured to separately import, based on a parameter type of each query prediction parameter, each query prediction parameter into a display area, associated with the parameter type, in a preset prediction information template, to generate the query prediction information.

Optionally, the query prediction model invoking unit includes:
- a candidate query model determining unit, configured to query, based on the device identifier, a plurality of candidate query models corresponding to the electronic device;
- a scenario type determining unit, configured to: select, based on a difference between a moment of sending each piece of historical data fed back by the electronic device and a moment of receiving the prediction request, historical data corresponding to the smallest difference and determine a current scenario type of the electronic device; and
- a query prediction model selection unit, configured to select from the candidate query models, a candidate query model that matches the scenario type as the query prediction model.

Optionally, the query prediction information includes query waiting duration, a positioning success rate, and/or at least one prediction position of the electronic device and confidence corresponding to the prediction position.

Optionally, the query prediction information generation unit 142 includes:
- a target data selection unit, configured to: if a prediction result corresponding to the query prediction information is a positioning failure state, select, based on a difference between a moment of sending each piece of historical data fed back by the electronic device and a moment of receiving the prediction request, historical data corresponding to the smallest difference as the target data;
- a prediction position output unit, configured to output a prediction position based on a historical position and a motion state that are carried in the target data and that correspond to the electronic device at a moment of feeding back position information;
- a positioning failure reason determining unit, configured to output a positioning failure reason based on a running state and signal strength that are carried in the target data and that correspond to the electronic device at a moment of feeding back position information; and
- a prediction parameter import unit, configured to import the prediction position and/or the positioning failure reason into the query prediction information.

Optionally, the historical data includes a heartbeat data packet fed back by the electronic device in a preset heartbeat period and/or historical positioning information fed back by the electronic device based on a historical query request.

Embodiment 3

In the conventional technology, when the terminal device of the user positions the associated electronic device, the user usually needs to stay in the query interface for a long time to wait for the positioning result, which reduces use efficiency of the terminal device and has poor user experience. To resolve the disadvantages, this embodiment of this application provides another system for positioning an electronic device. Different from Embodiment 1, this embodiment may combine a prediction server and a service server into one device, namely, the following server.

Figure 15:
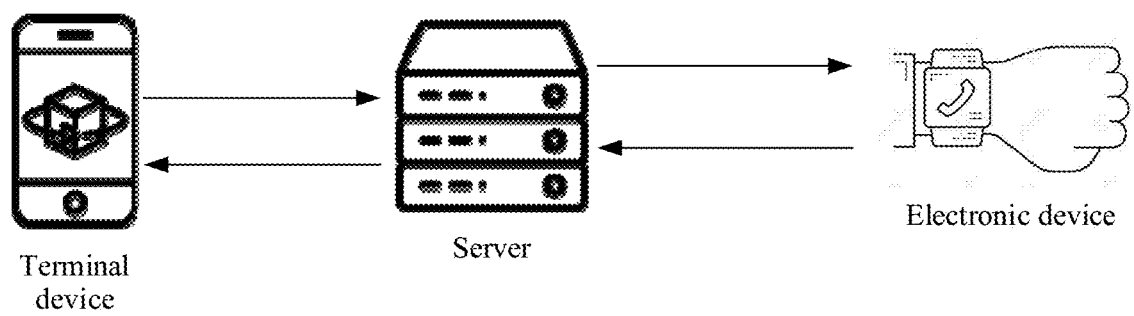
FIG. 15 is a schematic diagram of a structure of a system for positioning an electronic device according to another embodiment of this application.

FIG. 15 is a schematic diagram of a structure of the system for positioning the electronic device according to this embodiment of this application. Refer to FIG. 15. The system for positioning the electronic device includes the server, a terminal device, and the electronic device. The electronic device includes but is not limited to an electronic device, such as a smartwatch, a smart band, or a smart headset, that may be configured with a positioning module. A communication link may be established between the server, the terminal device, and the electronic device, and data exchange is performed through the communication link. In this embodiment, a client program matching the system for positioning the electronic device may be installed on the terminal device. A user may initiate a positioning query request about the electronic device in an operation interface corresponding to the client program. The terminal device may include man-machine interaction controls such as a touchscreen, a numeric keypad, and a mouse, so that the user enters related instructions, for example, the positioning query request, and a display module such as the touchscreen or a display outputs a positioning query result. The terminal device may further include a communications module, and establish a communication connection to the service server by using the communications module, so as to send the positioning query request to the server and receive query prediction information and the positioning query result that are fed back by the server. The server is specifically a physical server, and is configured to process a positioning service procedure and a query prediction procedure. The server may be configured with a data storage module. The server may store, by using the data storage module, a positioning query request sent by each terminal device and position information fed back by the electronic device. The data storage module of the server may be configured to store a query prediction model corresponding to each electronic device. The electronic device includes a positioning module, and the positioning module may be a global positioning system GPS module. The positioning module obtains position information, and sends the position information to the server in a preset heartbeat feedback period, or feeds back the position information when receiving a positioning query instruction sent by the server. The electronic device may further include a communications module, and establishes a long connection with the server by using the communications module, and send positioning information to the service server.

Different from Embodiment 1, this embodiment further provides the server including a query prediction model. An operation performed by the query prediction model is the same as an operation performed by the prediction server in Embodiment 1. Details are not described herein again.

In a possible implementation, the electronic device may be a device having a same function as the terminal device. In another application scenario, the electronic device may also initiate a positioning query instruction to the server, to determine a position of the terminal device.

In a possible implementation, the electronic device is specifically a wearable device, to ensure that position information obtained through collection is position information of a to-be-monitored object.

Figure 16:
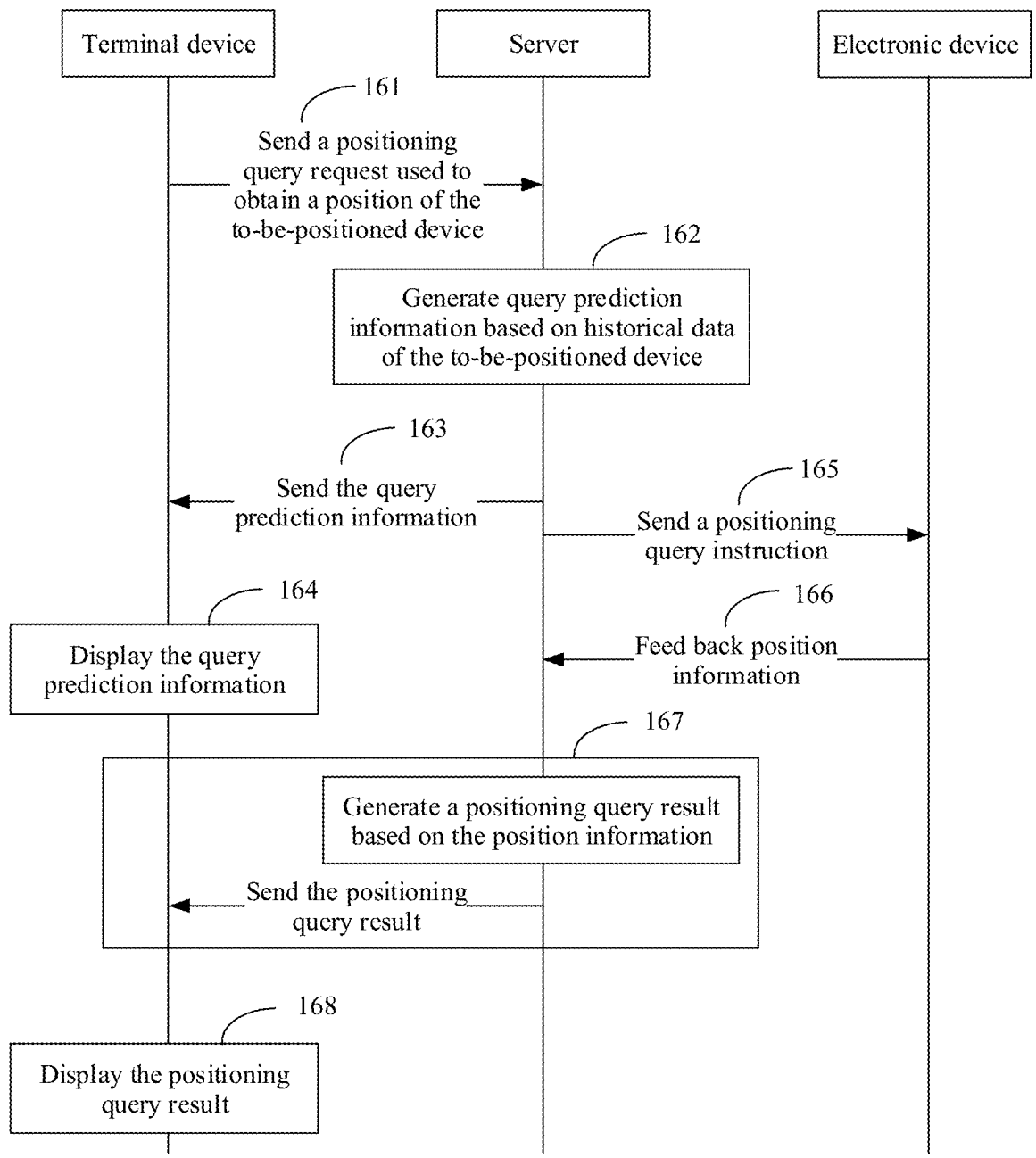
FIG. 16 is an interaction flowchart of a system for positioning an electronic device according to another embodiment of this application.

FIG. 16 is an interaction flowchart of the system for positioning the electronic device according to this embodiment of this application. Details are as follows:

In S161, the terminal device sends, to the server, the positioning query request used to obtain a position of the electronic device.

In S162, the server receives the positioning query request, and obtains the query prediction information, where the query prediction information is generated based on historical data of the electronic device.

In this embodiment, the server is equipped with the built-in query prediction model. The operation performed by the query prediction model is totally the same as the operation performed by the query prediction server. Details are not described herein again. Different from the service server in Embodiment 1, after receiving the positioning query request, the server does not generate a prediction request, but may output, by using the local query prediction model, query information corresponding to the electronic device at a current moment.

In a possible implementation, the server may be configured to store the historical data. In this case, the server may receive position information and/or a heartbeat data packet fed back by each electronic device, and the server may use the received data fed back by the electronic device as the historical data of the electronic device. Optionally, the server may configure a corresponding database for each electronic device. Each database is used to store historical data associated with the electronic device, establish an association relationship between each database and a device identifier of the electronic device, and generate a corresponding index table based on the association relationship. After receiving the positioning query request initiated by the terminal device, the server may determine, by using the index table, a database associated with the electronic device, and obtain the historical data stored in the database.

Further, in another embodiment of this application, S162 further includes: The server determines a prediction position of the electronic device based on the historical data of the electronic device. The server determines, based on the prediction position, signal strength corresponding to the electronic device at the prediction position. The server generates the query prediction information of the electronic device based on the signal strength.

Further, in another embodiment of this application, S162 further includes: The server obtains position information recently fed back by the electronic device. The server determines a query prediction model based on the position information recently fed back. The server outputs the query prediction information by using the query prediction model.

Further, in another embodiment of this application, S162 further includes: The server determines, based on the device identifier of the electronic device, a query prediction model corresponding to the electronic device. The server obtains the query prediction information by using the query prediction model, where the query prediction model is constructed based on the historical data of the electronic device.

Further, in another embodiment of this application, that the server obtains the query prediction information by using the query prediction model may specifically include: The server outputs a query prediction parameter by using the query prediction model. The server separately imports, based on a parameter type of each query prediction parameter, each query prediction parameter into a display area, associated with the parameter type, in a preset prediction information template, to generate the query prediction information.

Further, in another embodiment of this application, that the server obtains the query prediction information by using the query prediction model may specifically include: The server queries, based on the device identifier, a plurality of candidate query models corresponding to the electronic device. The server selects, based on a difference between a moment of sending each piece of historical data fed back by the electronic device and a moment of receiving the prediction request, historical data corresponding to the smallest difference and determines a current scenario type of the electronic device. The server selects from the candidate query models, a candidate query model that matches the scenario type as the query prediction model.

Further, in another embodiment of this application, after S162, the following steps are further included: If a prediction result corresponding to the query prediction information is a positioning failure state, the server selects, based on a difference between a moment of sending each piece of historical data fed back by the electronic device and a moment of receiving the prediction request, historical data corresponding to the smallest difference as target data; the server outputs a positioning failure reason based on a running state and signal strength that are carried in the target data and that correspond to the electronic device at a moment of feeding back position information; and/or the server outputs a prediction position based on a historical position and a motion state that are carried in the target data and that correspond to the electronic device at a moment of feeding back position information; and the server imports the positioning failure reason and/or the prediction position into the query prediction information.

In S163, the server sends the query prediction information to the terminal device.

In S164, the terminal device displays the query prediction information.

In S165, the server sends the positioning query instruction to the electronic device.

In S166, the electronic device feeds back the position information to the server in response to the positioning query instruction.

In S167, after receiving the position information sent by the electronic device, the service server generates the positioning query result based on the position information.

Further, in another embodiment of this application, after S167, the following step may be included: The server adjusts the query prediction model based on position information fed back by the electronic device based on the positioning query request, where the query prediction model is used to output the query prediction information.

In this embodiment, because the server is equipped with the built-in query prediction model, after the position information of the electronic device is received, the local query prediction model may be updated. For a specific update operation, refer to the description of S28. Details are not described herein again.

In S168, the terminal device displays the positioning query result.

Because implementations of S161, S163, S164, S165, S166, S167 and S168 are totally the same as implementations of corresponding steps in Embodiment 1, for specific descriptions, refer to the descriptions in Embodiment 1. Details are not described herein again.

In this embodiment of this application, when the positioning query request sent by the terminal device is received, the query prediction information corresponding to the positioning query request can be generated based on the historical data of the to-be-queried electronic device, and the query prediction information is output to the terminal device, so that the user can learn, based on the query prediction information, the prediction information such as time consumed for query and a positioning success rate, so as to determine whether to continue to wait for the query result or perform another operation on the terminal device, without the user keeping a query interface displayed at a frontend for a long time. This improves use efficiency of the terminal device and improves user experience.

Embodiment 4

Figure 17:
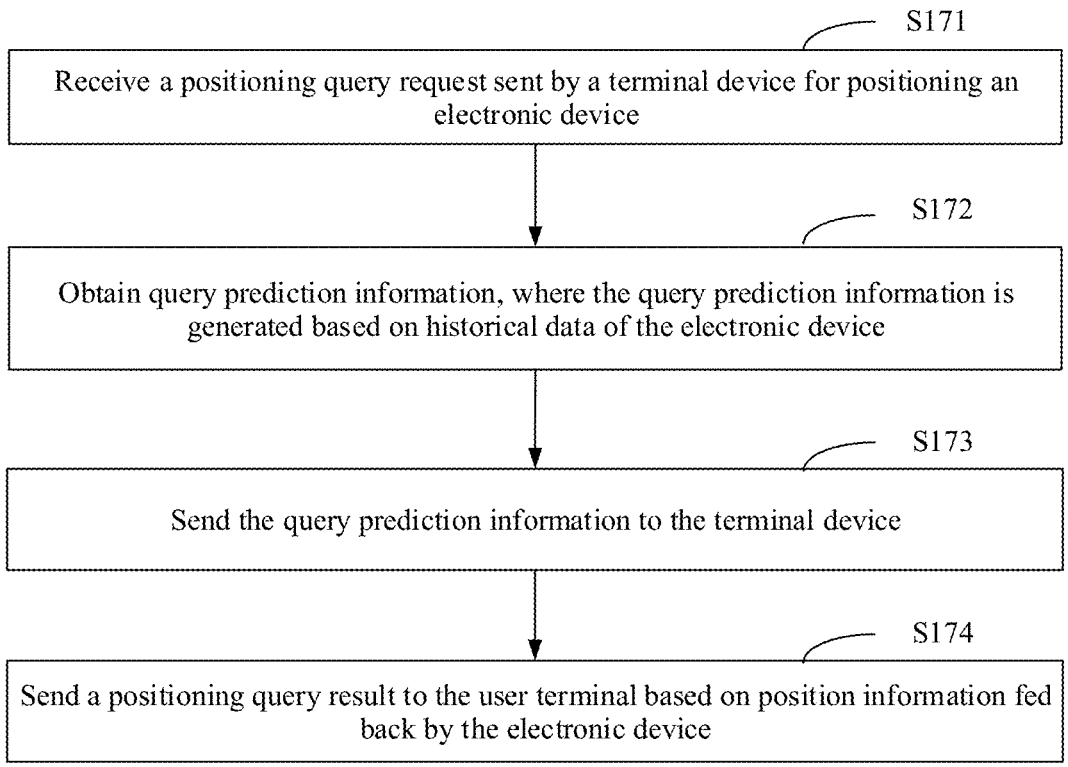
FIG. 17 is a flowchart of an implementation of a method for positioning an electronic device on a server side according to another embodiment of this application.

In Embodiment 3, the implementation process of the method for positioning the electronic device is described from a perspective of interaction between three parties (the server, the terminal device, and the electronic device). In Embodiment 4, the implementation process of the method for positioning the electronic device is described by using the server as an execution body of a procedure. In this embodiment of this application, the procedure is executed by the server. FIG. 17 is a flowchart of an implementation of the method for positioning the electronic device on a server side according to this embodiment of this application. Details are as follows:

In S171, the server receives the positioning query request sent by the terminal device for positioning the electronic device.

In S172, the server obtains the query prediction information, where the query prediction information is generated based on the historical data of the electronic device.

Further, in another embodiment of this application, the query prediction information includes query waiting duration, a positioning success rate, and/or at least one prediction position of the electronic device, and confidence corresponding to the prediction position.

Further, in another embodiment of this application, the historical data includes a heartbeat data packet fed back by the electronic device in a preset heartbeat period and/or historical positioning information fed back by the electronic device based on a historical query request.

Further, in another embodiment of this application, S172 includes the following steps:

The server determines the prediction position of the electronic device based on the historical data of the electronic device.

The server determines, based on the prediction position, signal strength corresponding to the electronic device at the prediction position.

The server generates the query prediction information of the electronic device based on the signal strength.

Further, in another embodiment of this application, S172 includes the following steps:

The server obtains the position information recently fed back by the electronic device.

The server determines the query prediction model based on the position information recently fed back.

The server outputs the query prediction information by using the query prediction model.

Further, in another embodiment of this application, S172 includes the following steps:

The server determines, based on the device identifier of the electronic device, the query prediction model corresponding to the electronic device.

The server obtains the query prediction information by using the query prediction model, where the query prediction model is constructed based on the historical data of the electronic device.

Further, in another embodiment of this application, that the server obtains the query prediction information by using the query prediction model includes:

The server outputs the query prediction parameter by using the query prediction model.

The server separately imports, based on the parameter type of each query prediction parameter, each query prediction parameter into a display area, associated with the parameter type, in the preset prediction information template, to generate the query prediction information.

Further, in another embodiment of this application, that the server determines, based on the device identifier of the electronic device, the query prediction model corresponding to the electronic device includes:

The server queries, based on the device identifier, the plurality of candidate query models corresponding to the electronic device.

The server selects, based on the difference between the moment of sending each piece of historical data fed back by the electronic device and the moment of receiving the prediction request, the historical data corresponding to the smallest difference, and determines the current scenario type of the electronic device.

The server selects from the candidate query models, a candidate query model that matches the scenario type as the query prediction model.

Further, in another embodiment of this application, after S172, the method further includes:

If the prediction result corresponding to the query prediction information is the positioning failure state, the server selects, based on the difference between the moment of sending each piece of historical data fed back by the electronic device and the moment of receiving the prediction request, the historical data corresponding to the smallest difference as the target data.

The server outputs the positioning failure reason based on the running state and the signal strength that are carried in the target data and that correspond to the electronic device at the moment of feeding back the position information.

The server imports the positioning failure reason into the query prediction information.

Further, in another embodiment of this application, after S172, the method further includes:

If the prediction result corresponding to the query prediction information is the positioning failure state, the server selects, based on the difference between the moment of sending each piece of historical data fed back by the electronic device and the moment of receiving the prediction request, the historical data corresponding to the smallest difference as the target data.

The server outputs the prediction position based on the historical position and the motion state that are carried in the target data and that correspond to the electronic device at the moment of feeding back the position information.

The server imports the prediction position into the query prediction information.

In S173, the server sends the query prediction information to the terminal device.

Further, in another embodiment of this application, after S173, the method may further include:

The server adjusts the query prediction model based on position information fed back by the electronic device based on the positioning query request, where the query prediction model is used to output the query prediction information.

In S174, the server sends the positioning query result to the user terminal based on the position information fed back by the electronic device.

Figure 18:
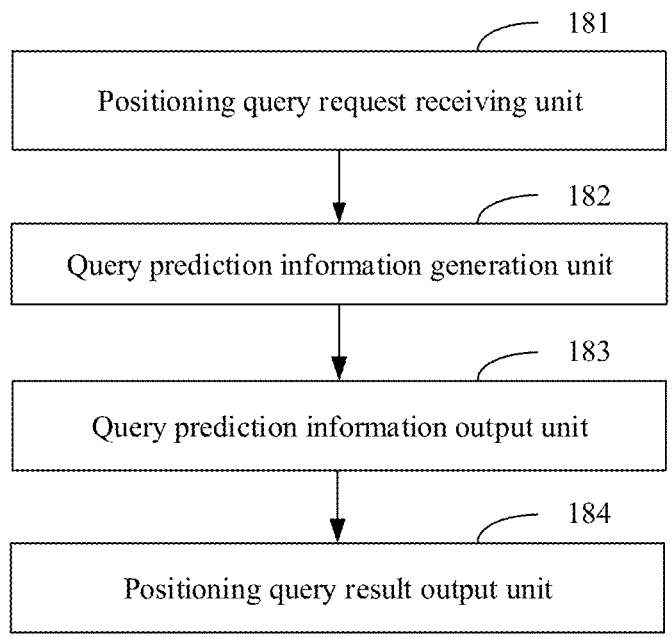
FIG. 18 is a block diagram of a structure of an apparatus for positioning an electronic device according to another embodiment of this application.

Corresponding to the method for positioning the electronic device in the foregoing embodiment, FIG. 18 is a diagram of a structure of a virtual apparatus corresponding to the server in the embodiment in FIG. 17 according to an embodiment of this application. For ease of description, only a part related to this embodiment of this application is shown.

Refer to FIG. 18. The virtual apparatus corresponding to the server includes:

a prediction request obtaining unit 181, configured to obtain a prediction request, where the prediction request is generated based on a positioning query request sent by a terminal device, and the positioning query request carries a device identifier of a to-be-queried electronic device;

a query prediction information generation unit 182, configured to determine historical data of the electronic device based on the device identifier, and generate query prediction information;

a query prediction information output unit 183, configured to output the query prediction information; and a positioning query result output unit 184, configured to send a positioning query result to the user terminal based on position information fed back by the electronic device.

Optionally, the query prediction information generation unit 182 includes:

a prediction position determining unit, configured to determine a prediction position of the electronic device based on the historical data of the electronic device;

a signal strength determining unit, configured to determine, based on the prediction position, signal strength corresponding to the electronic device at the prediction position; and a signal strength conversion unit, configured to generate the query prediction information of the electronic device based on the signal strength.

Optionally, the query prediction information generation unit 182 includes:

a recently-fed-back position obtaining unit, configured to obtain position information recently fed back by the electronic device;

a query prediction model obtaining unit, configured to determine a query prediction model based on the position information recently fed back; and a query prediction information determining unit, configured to output the query prediction information by using the query prediction model.

Optionally, the query prediction information generation unit 182 includes:

a query prediction model determining unit, configured to determine, based on the device identifier of the electronic device, a query prediction model corresponding to the electronic device; and a query prediction model invoking unit, configured to obtain the query prediction information by using the query prediction model, where the query prediction model is constructed based on the historical data of the electronic device.

Optionally, the virtual apparatus corresponding to the server further includes:

a query prediction model adjustment unit, configured to adjust the query prediction model based on position information fed back by the electronic device based on the positioning query request, where the query prediction model is used to output the query prediction information.

Optionally, the query prediction model invoking unit includes:

a query prediction parameter output unit, configured to output a query prediction parameter by using the query prediction model; and a query prediction parameter import unit, configured to separately import, based on a parameter type of each query prediction parameter, each query prediction parameter into a display area, associated with the parameter type, in a preset prediction information template, to generate the query prediction information.

Optionally, the query prediction model invoking unit includes:

a candidate query model determining unit, configured to query, based on the device identifier, a plurality of candidate query models corresponding to the electronic device;

a scenario type determining unit, configured to: select, based on a difference between a moment of sending each piece of historical data fed back by the electronic device and a moment of receiving the prediction request, historical data corresponding to the smallest difference and determine a current scenario type of the electronic device; and a query prediction model selection unit, configured to select from the candidate query models, a candidate query model that matches the scenario type as the query prediction model.

Optionally, the query prediction information includes query waiting duration, a positioning success rate, and/or at least one prediction position of the electronic device and confidence corresponding to the prediction position.

Optionally, the query prediction information generation unit 182 includes:

a target data selection unit, configured to: if a prediction result corresponding to the query prediction information is a positioning failure state, select, based on a difference between a moment of sending each piece of historical data fed back by the electronic device and a moment of receiving the prediction request, historical data corresponding to the smallest difference as the target data;

a prediction position output unit, configured to output a prediction position based on a historical position and a motion state that are carried in the target data and that correspond to the electronic device at a moment of feeding back position information;

a positioning failure reason determining unit, configured to output a positioning failure reason based on a running state and signal strength that are carried in the target data and that correspond to the electronic device at a moment of feeding back position information; and a prediction parameter import unit, configured to import the positioning failure reason into the query prediction information.

Optionally, the historical data includes a heartbeat data packet fed back by the electronic device in a preset heartbeat period and/or historical positioning information fed back by the electronic device based on a historical query request.

Figure 19:
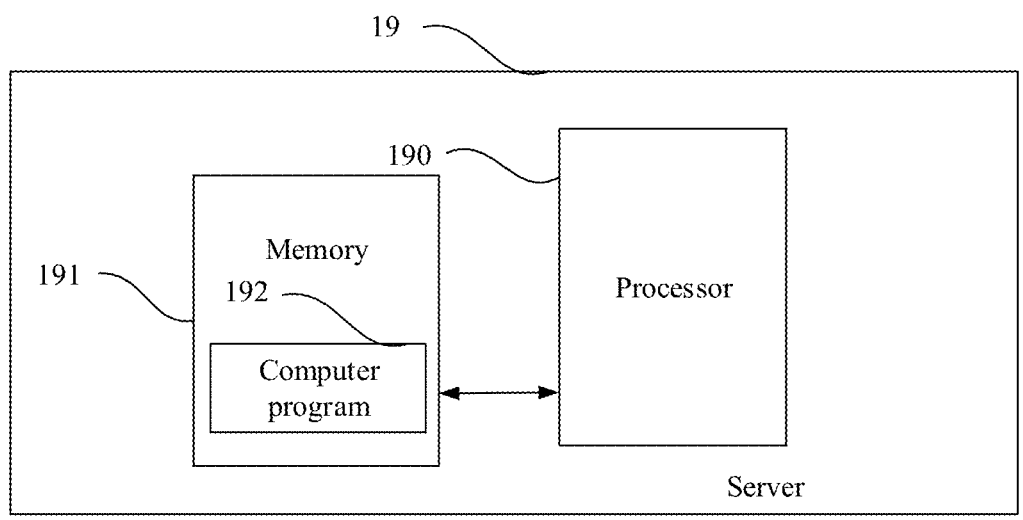
FIG. 19 is a schematic diagram of a server according to an embodiment of this application.

FIG. 19 is a schematic diagram of a structure of a server according to an embodiment of this application. As shown in FIG. 19, the server 19 in this embodiment includes at least one processor 190 (only one processor is shown in FIG. 19), a memory 191, and a computer program 192 that is stored in the memory 191 and can run on the at least one processor 190. When executing the computer program 192, the processor 190 implements steps in any one of the foregoing embodiments of the method for positioning the electronic device.

The server 19 may be a computing device such as a desktop computer, a notebook computer, a palmtop computer, or a cloud server. The server may include but is not limited to the processor 190 and the memory 191. A person skilled in the art can understand that FIG. 19 is merely an example of the server 19, and does not constitute a limitation on the server 19. The server 19 may include more or fewer components than those shown in the figure, or some components may be combined, or different components may be included. For example, the server 19 may further include an input/output device, and a network access device.

The processor 190 may be a central processing unit (CPU). The processor 190 may alternatively be another general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor or the like.

In some embodiments, the memory 191 may be an internal storage unit of the server 19, for example, a hard disk or a memory of the server 19. In some other embodiments, the memory 191 may be alternatively an external storage device of the server 19, for example, a plug-in hard disk, a smart media card (SMC), a secure digital (SD) card, or a flash card that is disposed on the server 19. Further, the memory 191 may alternatively include both an internal storage unit of the server 19 and an external storage device. The memory 191 is configured to store an operating system, an application, a bootloader, data, another program, and the like, for example, program code of the computer program. The memory 191 may be configured to temporarily store output data or to-be-output data.

It should be noted that content such as information exchange between the foregoing apparatuses/units and the execution processes thereof is based on a same concept as the method embodiments of this application. For specific functions and technical effects of the content, refer to the method embodiments. Details are not described herein again.

It may be clearly understood by a person skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

An embodiment of this application further provides a network device. The network device includes at least one processor, a memory, and a computer program that is stored in the memory and that can run on the at least one processor. When executing the computer program, the processor implements steps in any one of the foregoing method embodiments.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product is run on a mobile terminal, the mobile terminal is enabled to implement steps in the foregoing method embodiments when executing the computer program product.

When the integrated unit is implemented in the form of the software function unit and sold or used as an independent product, the integrated unit may be stored in a computer-readable storage medium. Based on such an understanding, all or some of the processes of the method in embodiments of this application may be implemented by a computer program instructing related hardware. The computer program may be stored in a computer-readable storage medium. When the computer program is executed by a processor, steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM), a random access memory (RAM), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

The foregoing embodiments are merely intended to describe the technical solutions of this application, but are not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A method for positioning an electronic device, wherein the method comprises:
    obtaining, by a prediction server, a prediction request sent by a service server, wherein the prediction request is generated by the service server based on a positioning query request sent by a terminal device, and the positioning query request carries a device identifier of the electronic device which is to-be-queried;
    determining, by the prediction server, historical data of the electronic device based on the device identifier, and generating query prediction information, including determining a query prediction model based on which the query prediction information is obtained, which further includes:
    outputting, by the prediction server, a query prediction parameter by using the query prediction model;
    separately importing, by the prediction server based on a parameter type of each query prediction parameter, each query prediction parameter into a display area, associated with the parameter type, in a preset prediction information template, to generate the query prediction information; and
    before the service server feeds back a positioning query result to the terminal device, outputting, by the prediction server, the query prediction information.

2. The method according to claim 1, wherein the determining the historical data of the electronic device based on the device identifier, and generating the query prediction information comprises:
    determining, by the prediction server, a prediction position of the electronic device based on the historical data of the electronic device;
    determining, by the prediction server based on the prediction position, signal strength corresponding to the electronic device at the prediction position; and
    generating, by the prediction server, the query prediction information of the electronic device based on the signal strength.

3. The method according to claim 1, wherein the determining the historical data of the electronic device based on the device identifier, and generating the query prediction information comprises:
    obtaining, by the prediction server, position information recently fed back by the electronic device;
    determining, by the prediction server, a query prediction model based on the position information recently fed back; and
    outputting, by the prediction server, the query prediction information by using the query prediction model.

4. The method according to claim 1, wherein the determining the historical data of the electronic device based on the device identifier, and generating the query prediction information comprises:
    determining, by the prediction server based on the device identifier of the electronic device, a query prediction model corresponding to the electronic device; and
    obtaining, by the prediction server, the query prediction information by using the query prediction model, wherein the query prediction model is constructed based on the historical data of the electronic device.

5. The method according to claim 4, further comprising:
    adjusting, by the prediction server, the query prediction model based on position information fed back by the electronic device based on the positioning query request, wherein the query prediction model is used to output the query prediction information.

6. The method according to claim 4, wherein the determining the query prediction model corresponding to the electronic device comprises:
    querying, by the prediction server based on the device identifier, a plurality of candidate query models corresponding to the electronic device;
    selecting, by the prediction server based on a difference between a moment of sending each piece of historical data fed back by the electronic device and a moment of receiving the prediction request, historical data corresponding to the smallest difference and determining a current scenario type of the electronic device; and
    selecting, by the prediction server from the candidate query models, a candidate query model that matches the scenario type as the query prediction model.

7. The method according to claim 1, wherein the query prediction information comprises:
   query waiting duration,
   a positioning success rate, and/or
   at least one prediction position of the electronic device and confidence corresponding to the prediction position.

8. The method according to claim 7, wherein the query waiting duration is a duration for making response to the positioning query request.

9. The method according to claim 8, wherein based on the query waiting duration in the query prediction information, a user determines whether to stay in a current interface to wait for the positioning query result or switch to another operation interface.

10. The method according to claim 1, wherein after the determining, by the prediction server, the historical data of the electronic device based on the device identifier, and generating the query prediction information, the method further comprises:
   based on a prediction result corresponding to the query prediction information being a positioning failure state, selecting, by the prediction server based on a difference between a moment of sending each piece of historical data fed back by the electronic device and a moment of receiving the prediction request, historical data corresponding to the smallest difference as target data;
   outputting, by the prediction server, a positioning failure reason based on a running state and signal strength that are carried in the target data and that correspond to the electronic device at a moment of feeding back position information; and
   importing, by the prediction server, the positioning failure reason into the query prediction information.

11. The method according to claim 1, wherein after the determining, by the server, the historical data of the electronic device based on the device identifier, and generating the query prediction information, the method further comprises:
   based on a prediction result corresponding to the query prediction information being a positioning failure state, selecting, by the prediction server based on a difference between a moment of sending each piece of historical data fed back by the electronic device and a moment of receiving the prediction request, historical data corresponding to the smallest difference as target data;
   outputting, by the prediction server, a prediction position based on a historical position and a motion state that are carried in the target data and that correspond to the electronic device at a moment of feeding back position information; and
   importing, by the prediction server, the prediction position into the query prediction information.

12. A method for positioning an electronic device, wherein the method comprises:
   receiving, by a server, a positioning query request sent by a terminal device for positioning the electronic device;
   obtaining, by the server, query prediction information, by using a query prediction model, including:
      outputting, by the server, a query prediction parameter by using the query prediction model;
      separately importing, by the server based on a parameter type of each query prediction parameter, each query prediction parameter into a display area, associated with the parameter type, in a preset prediction information template, to generate the query prediction information;
   wherein the query prediction information is generated based on historical data of the electronic device;
   sending, by the server, the query prediction information to the terminal device; and
   after sending the query prediction information to the terminal device, sending, by the server, a positioning query result to the terminal device based on position information fed back by the electronic device.

13. The method according to claim 12, wherein the obtaining the query prediction information comprises:
   determining, by the server, a prediction position of the electronic device based on the historical data of the electronic device;
   determining, by the server based on the prediction position, signal strength corresponding to the electronic device at the prediction position; and
   generating, by the server, the query prediction information of the electronic device based on the signal strength.

14. The method according to claim 12, wherein the obtaining the query prediction information comprises:
   obtaining, by the server, position information recently fed back by the electronic device;
   determining, by the server, a query prediction model based on the position information recently fed back; and
   outputting, by the server, the query prediction information by using the query prediction model.

15. The method according to claim 12, wherein the obtaining the query prediction information comprises:
   determining, by the server based on the device identifier of the electronic device, the query prediction model corresponding to the electronic device; and
   obtaining, by the server, the query prediction information by using the query prediction model, wherein the query prediction model is constructed based on the historical data of the electronic device.

16. The method according to claim 15, further comprising:
   adjusting, by the server, the query prediction model based on position information fed back by the electronic device based on the positioning query request, wherein the query prediction model is used to output the query prediction information.

17. The method according to claim 15, wherein the determining the query prediction model corresponding to the electronic device comprises:
   querying, by the server based on the device identifier, a plurality of candidate query models corresponding to the electronic device;
   selecting, by the server based on a difference between a moment of sending position information of each piece of historical data fed back by the electronic device and a moment of receiving the prediction request, historical data corresponding to the smallest difference and determining a current scenario type of the electronic device; and
   selecting, by the server from the candidate query models, a candidate query model that matches the scenario type as the query prediction model.

18. The method according to claim 12, wherein the query prediction information comprises:
   query waiting duration,
   a positioning success rate, and/or
   at least one prediction position of the electronic device and confidence corresponding to the prediction position.

19. The method according to claim 12, wherein after the obtaining, by the server, the query prediction information, the method further comprises:

based on a prediction result corresponding to the query prediction information being a positioning failure state, selecting, by the server based on a difference between a moment of sending each piece of historical data fed back by the electronic device and a moment of receiving the prediction request, historical data corresponding to the smallest difference as target data;

outputting, by the server, a positioning failure reason based on a running state and signal strength that are carried in the target data and that correspond to the electronic device at a moment of feeding back position information; and importing, by the server, the positioning failure reason into the query prediction information.

20. The method according to claim 12, wherein after the obtaining, by the server, the query prediction information, the method further comprises:

based on a prediction result corresponding to the query prediction information being a positioning failure state, selecting, by the server based on a difference between a moment of sending each piece of historical data fed back by the electronic device and a moment of receiving the prediction request, historical data corresponding to the smallest difference as target data;

outputting, by the server, a prediction position based on a historical position and a motion state that are carried in the target data and that correspond to the electronic device at a moment of feeding back position information; and importing, by the server, the prediction position into the query prediction information.

* * * * *